United States Patent [19]
Suzuki et al.

[11] Patent Number: 5,541,684
[45] Date of Patent: Jul. 30, 1996

[54] CAMERA HAVING PHOTOGRAPHIC FRAME SIZE CHANGING MEANS CONTROLLED BY AN EXTERNAL OPERATING MEMBER

[75] Inventors: Ikumu Suzuki, Okaya; Tatsuya Suzuki, Tokyo; Shunji Matsutani, Akishima; Hiroaki Miyazaki, Tsukui; Yasuo Yamazaki, Hino, all of Japan

[73] Assignee: Olympus Optical Co. Ltd., Tokyo, Japan

[21] Appl. No.: 300,073

[22] Filed: Sep. 2, 1994

Related U.S. Application Data

[63] Continuation of Ser. No. 49,225, Apr. 9, 1993, abandoned.

[30] Foreign Application Priority Data

| Apr. 20, 1992 | [JP] | Japan | 4-099817 |
| Jun. 22, 1992 | [JP] | Japan | 4-162982 |
| Nov. 2, 1992 | [JP] | Japan | 4-294492 |

[51] Int. Cl.⁶ ............................................. G03B 37/00
[52] U.S. Cl. ........................... 354/94; 354/159; 354/222
[58] Field of Search ............................... 354/159, 94, 222

[56] References Cited

U.S. PATENT DOCUMENTS

| 2,247,104 | 6/1941 | Takars | 354/159 |
| 3,860,937 | 1/1975 | Wolfe | 354/64 |
| 4,716,427 | 12/1987 | Shyu | 354/203 |
| 4,987,436 | 1/1991 | Misawa | 354/203 |
| 5,010,357 | 4/1991 | Misawa | 354/159 |
| 5,066,971 | 11/1991 | Kodaira | 354/159 X |
| 5,086,311 | 2/1992 | Naka et al. | 354/195.1 |
| 5,353,077 | 10/1994 | Tanaka et al. | 354/94 |

FOREIGN PATENT DOCUMENTS

| 3-84825 | 8/1991 | Japan . |
| 3-84821 | 8/1991 | Japan . |
| 3-84822 | 8/1991 | Japan . |
| 3-84824 | 8/1991 | Japan . |
| 4-152334 | 5/1992 | Japan . |

*Primary Examiner*—David M. Gray
*Assistant Examiner*—J. K. Han
*Attorney, Agent, or Firm*—Louis Weinstein

[57] ABSTRACT

A camera capable of changing over the photographing frame size thereof having a photographing frame size changing member disposed in a camera body and capable of moving between a first position at which the photographing frame size changing member partially covers a film exposing opening and a second position at which the changing member does not cover the film exposing opening; and an operation member disposed on a rear cover of the camera for selectively bringing the photographing frame size changing member to the first position or the second position, wherein the changing member and the operation member are non-mechanically connected to each other in a state where the film is interposed between the changing member and the operation member. In another embodiment flexible changing members, being positively driven, are guided from a position behind the film to a position in front of the film exposing opening. Visual and/or audible indicators are provided to alert an operator as to the photographing frame size.

100 Claims, 20 Drawing Sheets

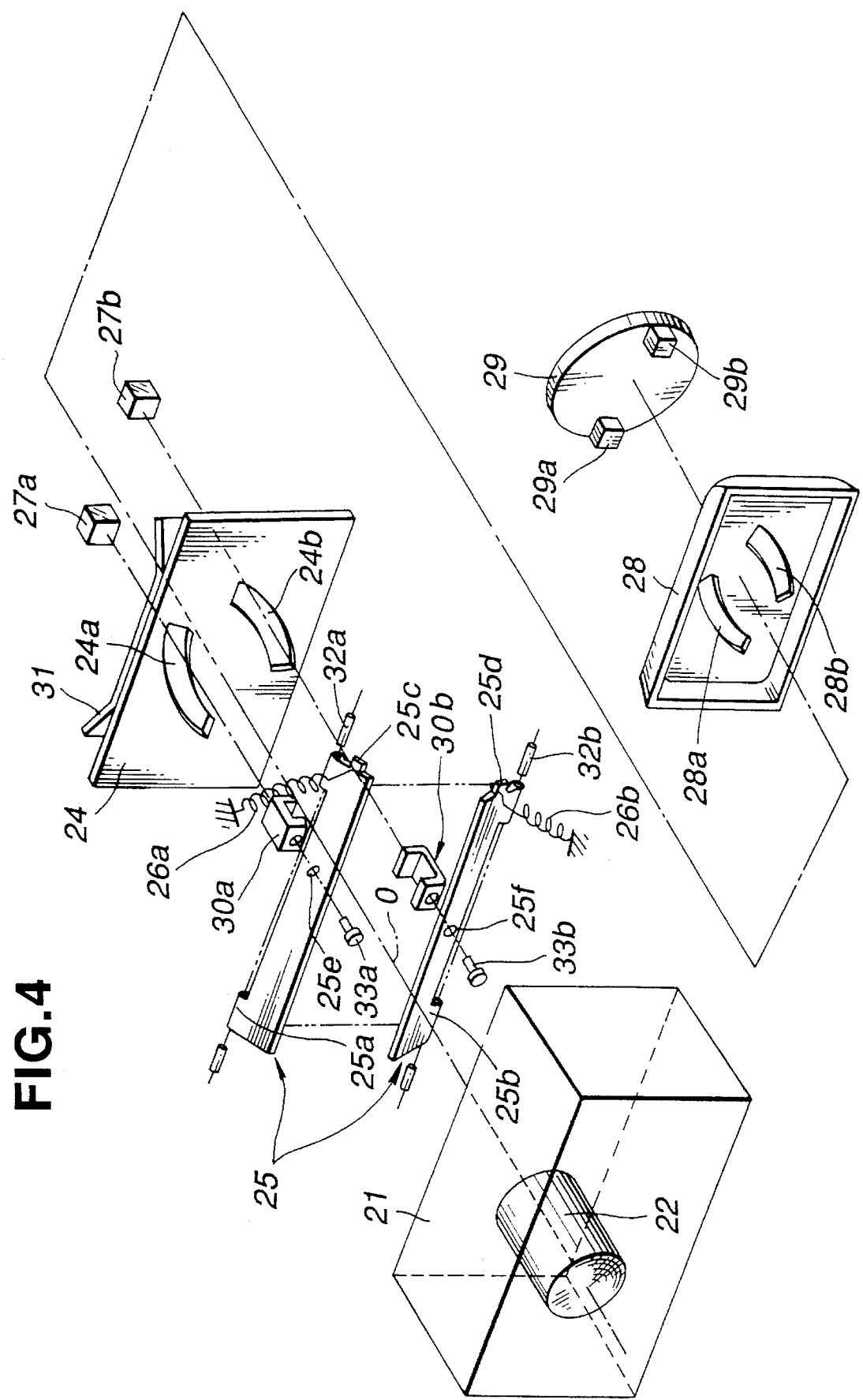

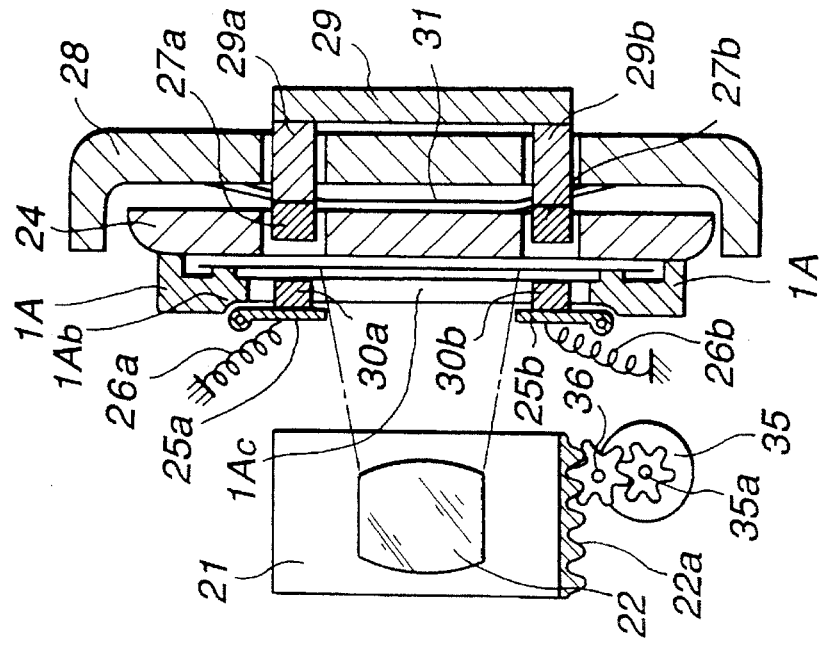
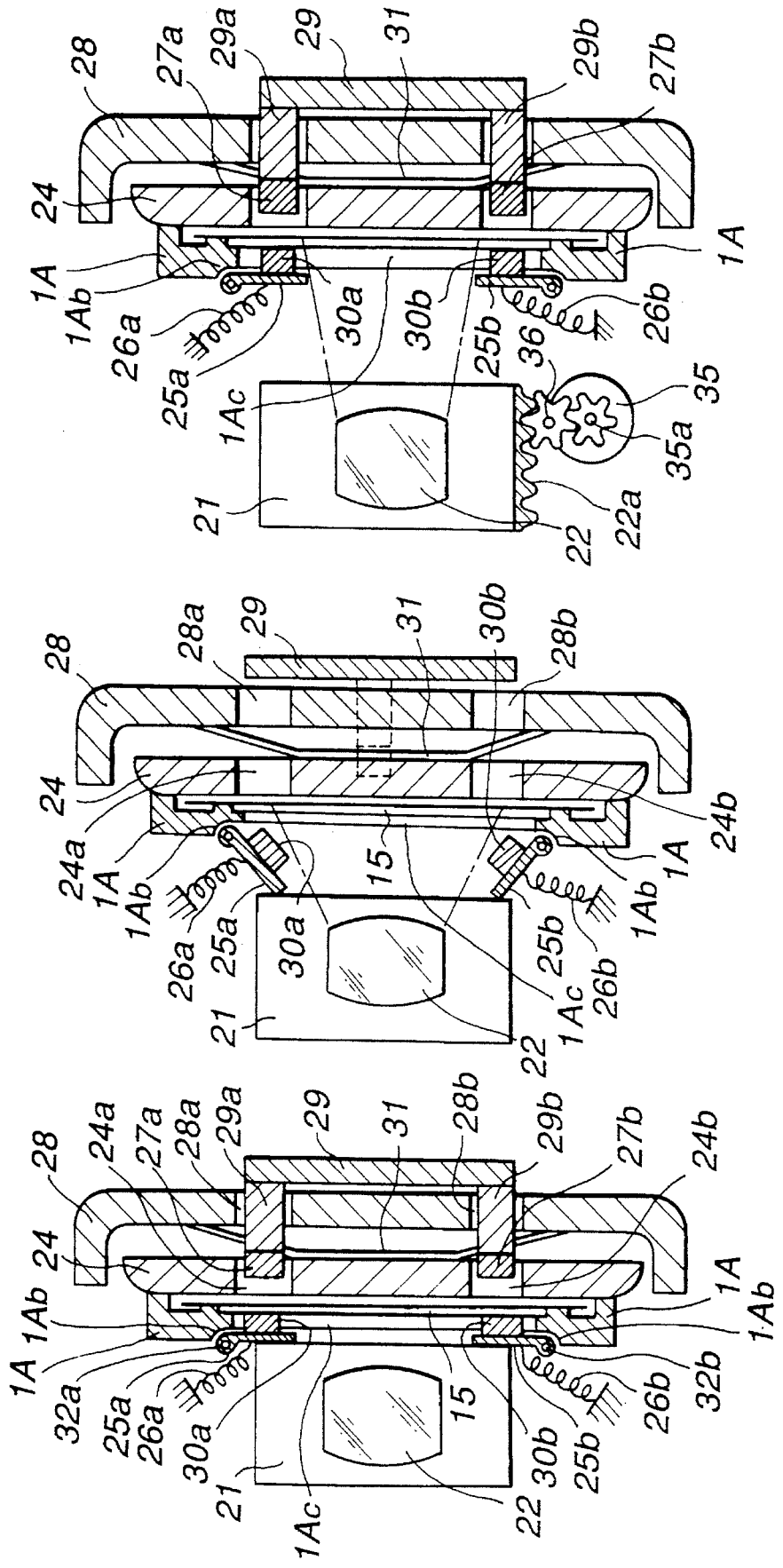

CAMERA HAVING PHOTOGRAPHIC FRAME SIZE CHANGING MEANS CONTROLLED BY AN EXTERNAL OPERATING MEMBER

This is a continuation of application Ser. No. 08/049,225, filed Apr. 19, 1993, now abandoned.

BACKGROUND OF THE INVENTION

1. Field of the Invention

The present invention relates to a camera capable of changing over the size of a photographing frame thereof, and more particularly to a camera capable of changing over a size of the photographing frame by selecting a desired exposure frame size thereof at a time of taking a photograph.

2. Related Background Art

As is well known, a variety of cameras capable of changing over the photographing frame size thereof have been suggested. For example, there has been a known camera adapted to a rolled film (JIS135 film) having a width of 35 mm and capable of selecting, at the time of loading a film, a large exposure frame size of a standard size of 36 mm×24 mm called a Leica size or a small exposure frame size of 18 mm×24 mm called a half size.

Recently, a camera has been provided that uses the foregoing rolled film having a width of 35 mm and capable of arbitrarily selecting a full-size exposure frame of 36 mm×24 mm or a smaller size, for example, a panorama frame size of 36 mm×13 mm which is a laterally-elongated size at the time of taking a photograph after the film has been loaded from an outer surface of the camera.

Also the applicant of the present invention has suggested a photographing frame changing over mechanism between the full size and the panorama size in U.S. Ser. No. 07/814,414, filed Dec. 23, 1991, and Japanese Laid-open Patent Application serial No. Hei-4-84065/1992. The foregoing mechanisms have an arrangement that a masking member for restricting the exposure frame size is disposed between the aperture in the camera body and the photographing lens, and the masking member is operated by a ring linked to an operation member so that the change over between the full size and the panorama size is performed. Another technical means has been disclosed in Japanese Laid-Open Utility Model Application 1991 (Hei/3)-84821 which disclosed a camera capable of changing over between standard photography and panorama photography and having an arrangement that a light-shielding member is moved to a panorama photographing position at the time of the movement of the photographing lens to the collapsed position.

The technical means disclosed in U.S. Ser. No. 07/814,414 and Japanese Laid-Open Patent Application 1992 (Hei/4)-84065 has the arrangement that the changing over means comprising the masking member is disposed between the aperture in the camera body and the photographing lens, causing a problem to arise in that the size of the camera cannot be reduced, it is difficult to secure the space for it, and the design cannot be made freely. Also the technical means disclosed in Japanese Laid-Open Utility Model Application 1991 (Hei/3)-84821 encounters the problem of providing a structure which is too complicated and which presents difficulty in reducing the size.

Furthermore, the arrangement of the foregoing prior art that the changing means is included in the camera body without exception arises a necessity of individually manufacturing the cameras capable of changing over the photography mode to select the panorama size and cameras adapted to only the standard photography. Therefore, the manufacturing process increases, which causes the cost to be enlarged.

SUMMARY OF THE INVENTION

A first object of the present invention is to provide a camera capable of changing over the photographing frame size thereof which is able to overcome the foregoing problems experienced with the conventional technology and which enables the change over of the photographing frame size to be performed by a simple structure.

A second object of the present invention is to provide a camera capable of changing over the photographing frame size thereof which enables cameras to easily be manufactured depending upon whether or not the photographing frame size changing over mechanism is provided.

A third object of the present invention is to provide a camera capable of changing over the photographing frame size thereof with which a user is able to easily recognize the selected photographing frame size.

A fourth object of the present invention is to provide a camera capable of changing over the photographing frame size thereof having an arrangement that a magnet is utilized to change over the photographing frame size from the outside of the camera, wherein the selected photographing frame size can immediately be recognized.

Briefly, the present invention provides a camera capable of changing over the photographing frame size thereof having an arrangement such that the size of the photographing frame is changed over by covering a portion of an aperture, which is an exposure opening, with a masking member, the camera comprising frame size changing over operation means provided for a rear cover and performing an operation of selecting the photographing frame size, a photographing frame size restriction means disposed adjacent to the aperture in the camera body, and a means for operating the restriction means in synchronization with the frame size changing over operation means. A camera capable of changing over the frame size thereof having an arrangement that a magnet is utilized to change over the photographing frame size from outside the camera, the camera comprising a notifying means for displaying the changed over frame size in accordance with the changing over operation performed by a frame size changing over operation means.

Other and further objects, features and advantages of the invention will be more fully apparent from the following description.

According to the present invention, the frame size restriction means can easily be constituted, and a portion of the frame size restriction means is moved by a lens barrel when the lens barrel is collapsed into the camera body, causing the space required to dispose the frame size restriction means to be reduced and causing the lens barrel to be collapsed deeply into the camera body. Therefore, significant effects can be obtained in that the size of the camera can be reduced, and that the selected frame size by changing over is displayed, and, accordingly, a mistake in selecting the photographing frame size can be prevented. Therefore, a camera capable of changing over the photographing frame size thereof that is able to overcome the foregoing problems experienced with the conventional technology can be provided.

BRIEF DESCRIPTION OF THE DRAWINGS

FIG. 4 is an exploded perspective view which illustrates an essential portion of a camera capable of changing over the photographing frame size thereof according to a second embodiment of the present invention;

FIGS. 5A, 5B and 5C respectively are enlarged vertical cross sectional views which illustrate an essential portion of a photography preparation state and a frame size changed over state in the camera capable of changing over the photographing frame size thereof according to the second embodiment;

DETAILED DESCRIPTION OF PREFERRED EMBODIMENTS

Figure 1:
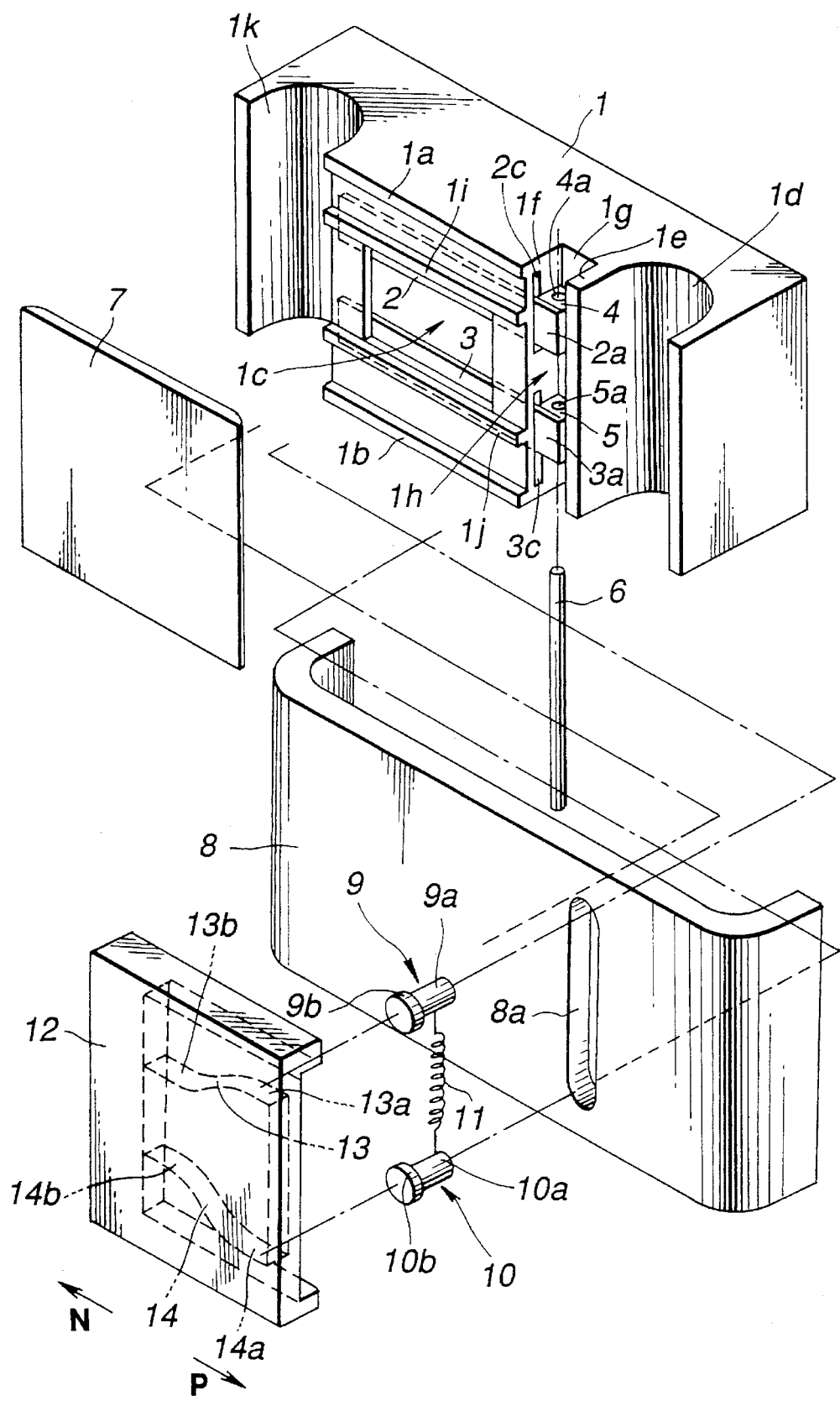
FIG. 1 is an exploded perspective view which illustrates an essential portion of a camera capable of changing over the photographing frame size thereof according to a first embodiment of the present invention.

FIG. 1 is an exploded perspective view of an essential portion of a first embodiment of a camera capable of changing over the size of the photographing frame thereof according to the present invention when viewed from the rear side thereof. To the rear of a photographing lens (omitted from illustration) and as well as in the central portion in the rear portion of a camera body 1, an aperture 1c serving as an exposing opening is formed. The aperture 1c determines a photographing angle of view to be made with a film 15 (see FIGS. 2A and 2B) loaded into a film supply chamber 1k. The film supply chamber 1k is formed on either side of the aperture 1c, while a film winding chamber 1d is formed on the residual side of the aperture 1c, both the film supply chamber 1k and the film winding chamber 1d being formed in the camera body 1.

Film rails 1i and 1j are disposed to project at two vertical end portions interposing the foregoing aperture 1c, the film rails 1i and 1j running parallel to a direction in which a film is moved. Furthermore, pressure-plate rails 1a and 1b are disposed to project on the upper and lower outer sides of the rails 1i and 1j. When a rear cover 8 disposed on the rear side of the camera body 1 and, being capable of being opened/closed, is closed, the pressure-plate rails 1a and 1b are pressed against a pressure plate 7 disposed at the central portion of the inner surface of a rear cover 8, the central portion facing the aperture 1c. The film 15 can be kept flat by the film rails 1i, 1j and the pressure plate 7. Furthermore, the movement of the film 15 is guided by the film rails 1i and 1j.

The camera body 1 further comprises a guide groove 1h disposed between the aperture 1c and the film winding chamber 1d, the guide groove 1h running in the vertical direction. The guide groove 1h holds therein mask supporting members 4 and 5 disposed in the upper and the lower portions thereof and made of magnetic material, the mask supporting members 4 and 5 being capable of respectively sliding along vertical wall surfaces 1e and 1f of the groove 1h.

The mask supporting members 4 and 5 respectively have vertical through holes 4a and 5a at the central portions thereof, both of the through holes 4a and 5a being loosely received by a fixing guide shaft 6.

In front of the aperture 1c, masking members 2 and 3 are disposed in the camera body 1, the masking members 2 and 3 being respectively made of short tag-like thin plates extending in the lateral direction of the camera body 1. The masking members 2 and 3 are capable of moving vertically in parallel to the opening surfaces of the aperture 1c to serve as photographing frame size restriction means that mask the upper and the lower end portions of the aperture 1c, the masking members 2 and 3 being secured to the rear sides of the mask supporting members 4 and 5 at their end portions 2a and 3a. Furthermore, vertical guide grooves 2c and 3c respectively penetrating the wall surface if are formed in the wall surface 1f. The end portions 2a and 3a of the masking members 2 and 3 penetrating the guide grooves 2c and 3c are secured to the mask supporting members 4 and 5. Therefore, the vertical movements of the masking members 2 and 3 are realized by the mask supporting members 4 and 5.

On the other hand, the rear cover 8, that is capable of opening/closing with respect to the camera body 1, is disposed to optically hermetically cover the rear side of the camera body 1 in such a manner that the rear cover 8 prevents unwanted light from exposing or fogging the film when cover 8 is closed. Furthermore, a vertically-elongated guide hole 8a is formed in the movement passage for the mask supporting members 4 and 5, that is, at the positions facing the guide groove 1h. On the rear side of the rear cover 8, a photographing frame size changing-over operation member 12 is disposed to be capable of sliding on the outer surface of the rear cover 8 in a parallel direction to the direction in which the film 15 is moved. The photographing frame size changing-over operation member 12 is operated in synchronization with a photographing frame size selection operation portion (omitted from illustration), for example, a frame size changing-over button provided for the rear cover 8. A projecting cam portion having a pair of cam surfaces 13 and 14 is formed at the central portion in the front surface of the photographing frame size changing-over operation member 12. The projecting cam portion is formed on a lower planar recess portion formed by cutting the front surface of the operation member 12. The projecting cam portion comprises an ascending cam surface 13 formed so that the vertical distance adjacent to the film supply chamber 1k is short and the vertical distance adjacent to the film winding chamber 1d is long, the ascending cam surface 13 having an upper wall gently ascending from an upper wall portion 13b adjacent to the supply chamber to an upper wall portion 13a adjacent to the winding chamber. The projecting cam portion further comprises a descending cam surface 14 having a lower wall, which opposes the upper wall of cam surface 13 and which gently descends from a lower wall portion 14b adjacent to the supply chamber to a lower wall 14a adjacent to the winding chamber.

Figure 2A:
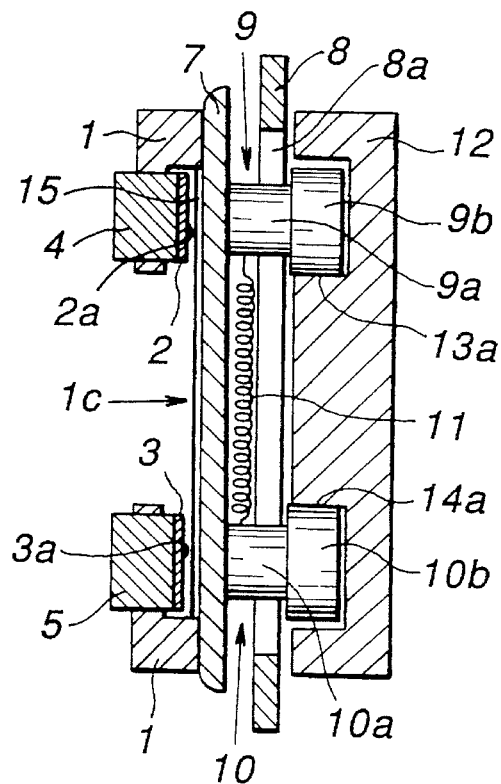
FIGS. 2A and 2B respectively are enlarged vertical cross sectional views which illustrate an essential portion of a state where the frame size is changed over in the camera capable of changing over the photographing frame size thereof according to the first embodiment.
Figure 2B:
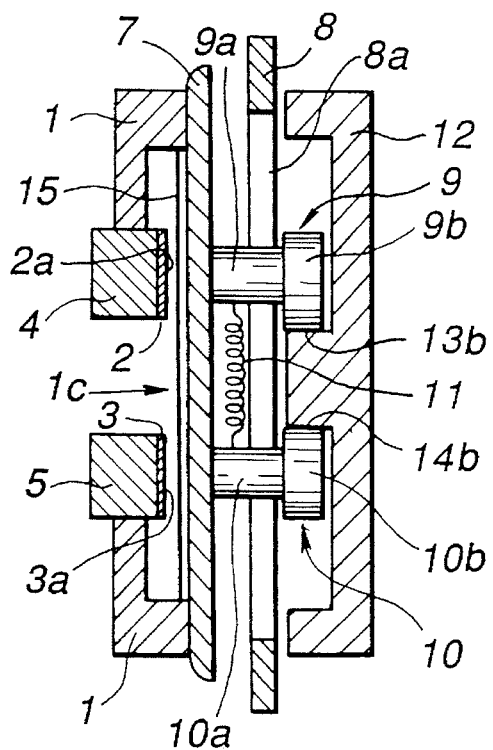

Short-cylindrical-shaped magnets 9 and 10 forming magnetic connection means are pressed against the upper and the lower walls of the projecting cam portion. That is, the magnets 9 and 10 respectively have their base portions comprising large-diameter portions 9b and 10b and leading portions comprising small-diameter portions 9a and 10a. Furthermore, a contractive coil spring 11 arranged between the small-diameter portions 9a and 10a acts to press the large-diameter portions 9b and 10b against the upper and the lower walls of the foregoing projecting cam portion. Therefore, when the cam surfaces 13 and 14 have been moved (see arrows N and P), the magnets 9 and 10 are vertically moved. The small-diameter portions 9a and 10a penetrate the elongated guide hole 8a to project into the camera body 1. The end surfaces of the projecting small-diameter portions 9a and 10a are disposed to have their magnetic fields pass through the pressure plate 7, the film 15, the masking members 2 and 3 so that the projecting small-diameter portions 9a and 10a are, as shown in FIGS. 2A and 2B, magnetically coupled to the mask supporting members 4 and 5 made of the magnetic material.

As described above, the photographing frame size changing-over operation member 12 forms a moving means for moving the masking members 2 and 3 from outside the camera to correspond to the selected frame size. When the photographing frame size changing-over operation member 12 slides in a direction designated by an arrow N or P shown in FIG. 1, the mask supporting members 4 and 5 magnetically connected to the magnets 9 and 10 vertically slide due to the movements of the magnets 9 and 10. Hence, the making members 2 and 3 change over the masking of the opened surface of the aperture 1c while moving in the vertical direction.

Figure 3A:
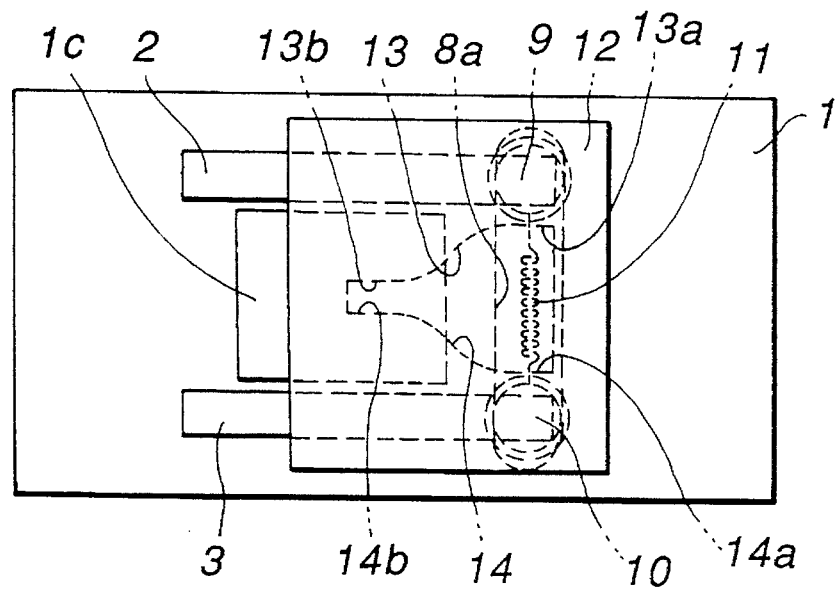
FIGS. 3A and 3B respectively are rear side views which illustrate a state where the frame size is changed over in the camera capable of changing over the photographing frame size thereof according to the first embodiment when viewed from a position in the rear of the camera.
Figure 3B:
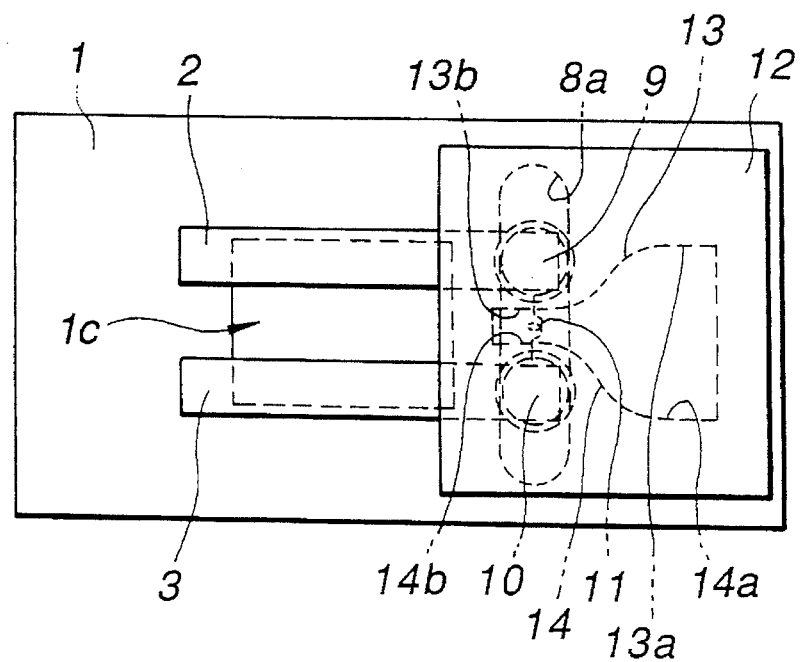

The frame changing over operation performed by the camera capable of changing over the size of the photographing frame thereof will now be described. FIGS. 2A and 3A both illustrate a state where a photograph is taken by employing a large photographing frame, that is, the full size (36 mm×24 mm) frame. FIGS. 2B and 3B both illustrate a state where a photograph is taken by employing a small photographing frame, for example, the panoramic size (36 mm×13 mm).

When the film 15 is loaded into the camera 1, the film 15 is placed between the masking members 2, 3 and the pressure plate 7. When the full-size photograph is taken, the photographing frame size changing-over operation member 12 is slid in the direction N (see FIG. 1). As a result, the cam surfaces 13 and 14 on the photographing frame size changing-over operation member 12 cause the distance between magnets 9 and 10 to be widened by pressure according to the positions of the upper and lower walls 13a and 14a formed at the end portion of the cam surfaces. That is, the magnet 9 is moved upwards, while the magnet 10 is moved downwards. Then, the mask supporting members 4 and 5 magnetically coupled (ie. "attracted") to the magnets 9 and 10 respectively are moved in the vertical direction due to the movements of the magnets 9 and 10. At this time, the elastic force of the contractive coil spring 11 is charged. Since the masking members 2 and 3 are secured to be integrated with the mask supporting members 4 and 5, the masking member 2 is moved upwards and the masking member 3 is moved downwards due to the respective movements of the mask supporting members 4 and 5, resulting in movements to a position outside the aperture 1c. Therefore, the photographing frame provided for the film 15 is the full-size photographing frame (see FIGS. 2A and 3A).

When a panorama size photograph is taken, the changing-over operation member 12 is caused to slide in the direction P (see FIG. 1). As a result, the cam surfaces 13 and 14 on the changing-over operation member 12 cause the magnets 9 and 10 to be moved to come closer to one another so that their interval is narrowed according to the positions of the upper walls 13b and 14b at the other end portions of the cam surface. That is, the magnet 9 is moved downwards along the cam surface 13, while the magnet 10 is moved upwards along the cam surface 14. Hence, the movements of the magnets 9 and 10 slide the mask supporting members 4 and 5, which are magnetically attracted to the magnets 9 and 10, in the upper direction and the lower direction, respectively. Thus, the masking members 2 and 3 are moved due to the movements of the mask supporting members 4 and 5 in such a manner that the masking member 2 is moved downwards and the masking member 3 is moved upwards to mask the top and the bottom end portions of the aperture 1c. As a result, a panorama size aperture 1c is formed, enabling a panorama size photograph to be taken on the film 15 (see FIGS. 2B and 3B).

Although the first embodiment has the arrangement that the masking members 2 and 3 are moved to mask the aperture 1c so that the photographing frame size is changed over, a structure may be employed in which the camera body 1 is divided into portion at a predetermined position to cause the divided portions to perform the role of the masking members 2 and 3, resulting in the portion, in which the aperture is formed, to be moved. Although the first embodiment is described about the structure in which the full size, that is, the standard size and the panorama size are changed over for example, the frame size is not limited to this. For example, the arrangement according to the first embodiment may be adapted to a changing-over mechanism between the standard size and the half size, or between the standard size and a photographing frame size larger than the standard size.

A second embodiment of the present invention will now be described with reference to FIG. 4.

In contrast with the first embodiment having the arrangement that the masking members 2 and 3 of the photographing frame size changing-over means are moved substantially in parallel to the aperture 1c so that the opened surface of the aperture 1c is covered, a camera capable of changing over the size of the photographing frame thereof according to the second embodiment has an arrangement that the photographing frame size restriction means is rotated in the forward/rearward direction to cover the opened surface of the aperture.

FIG. 4 is a perspective and exploded view which illustrates the photographing frame size restriction means when viewed from a diagonally upper, forward position. A camera body 1A includes laterally-elongated masking members 25a and 25b which are rotatably and vertically symmetrically fastened by supporting shafts 32a and 32b at positions in front of the vertical ends of an aperture 1Ac (see FIGS. 5A to 5C) in the rear of a lens barrel 21 including a photographing optical system 22. The masking members 25a and 25b and the supporting shafts 32a and 32b are received within a recess 1Ab (see FIGS. 5A to 5C) formed in the aperture 1Ac of the camera body 1A adjacent to the photographing lens, the recess 1Ab having two vertical end portions each formed into a quadrant.

Projecting members 25c and 25d for hooking springs thereto are formed at either one of the end portions of the masking members 25a and 25b. Springs 26a and 26b respectively are arranged between the projecting members 25c, 25d and stationary members of the camera body 1A, the springs 26a and 26b acting to rotate clockwise the masking member 25 around the supporting shaft 32a (when viewed in FIG. 4) and to rotate counterclockwise the masking member 25b around the supporting shaft 32b (when viewed in FIG. 4).

In the central portion on the rear surfaces of the masking members 25a and 25b, channel-shaped magnetic members 30a and 30b are secured by pins 33a and 33b penetrating pin holes 25e and 25f formed in the masking members 25a and 25b to be symmetrically positioned vertically. As a result, the magnetic members 30a and 30b can be rotated integrally with the masking members 25a and 25b.

A rear cover 28, which can be selectively opened/closed with respect to the camera body 1A, is fastened adjacent to the rear surface of the camera body 1A. A film pressure plate 24 is fastened adjacent to the inner surface of the rear cover 28 to face the aperture 1Ac, the film pressure plate 24 being urged by a leaf spring 31 which generates proper abutting force. The film pressure plate 27 and the rear cover 28, to which the pressure plate 24 is fastened, respectively have guide grooves 24a, 24b, 28a and 28b at the upper left portions and the lower right portions on the same circumference around the optical axis O of the lens when viewed from a front portion, the guide grooves 24a, 24b, 28a and 28b being formed into substantially-quadrant circular arcs to be positioned symmetrically. As a result, rotational movements of magnets 27a and 27b to be described later are guided.

At the central portion of the rear side of the rear cover 29, a disc-shaped dial 28 is rotatably fastened to the rear cover 28. The dial 29 has supporting members 29a and 29b that project on the outer periphery of the front surface thereof, the supporting members 29a and 29b being disposed to face each other on the diameter line of the dial 29. The supporting members 29a and 29b have the magnets 27a and 27b secured thereto, the magnets 27a and 27b having the same cross sectional shapes as those of the leading surfaces of the supporting members 29a and 29b. The magnets 27a and 27b respectively penetrate the guide grooves 28a and 28b of the rear cover 28 to be received within the guide grooves 24a and 24b of the film pressure plate 24. As a result, only when the magnets 27a and 27b respectively are positioned in the vertical positions (see FIGS. 5A and 5C), the magnets 27a and 27b face and magnetically attract the magnetic members 30a and 30b. When the magnets 27a and 27b are positioned laterally as shown in FIG. 5B, the foregoing magnetic connection (i.e. "attraction") is suspended. The foregoing magnetic connection force is larger than the urging force attained from the springs 26a and 26b.

The dial 29 is guided by each of the guide grooves 24a, 24b, 28a and 28b to be rotated through a quarter rotation. When the dial 29 is rotated counterclockwise when viewed from a rear portion of the camera, the photographing frame is set to the panorama mode, and, accordingly, the magnets 27a and 27b are positioned vertically. Therefore, a state is realized in which the magnets 27a and 27b respectively magnetically attract the magnetic members 30a and 30b.

When the dial 29 is rotated clockwise when viewed from a rear position of the camera to set the photographing frame to the normal mode, the magnets 27a and 27b are positioned laterally. As a result, a state is realized in which the magnetic attractions between the magnets 27a and 27b and the magnetic members 30a and 30b are suspended.

Figure 6:
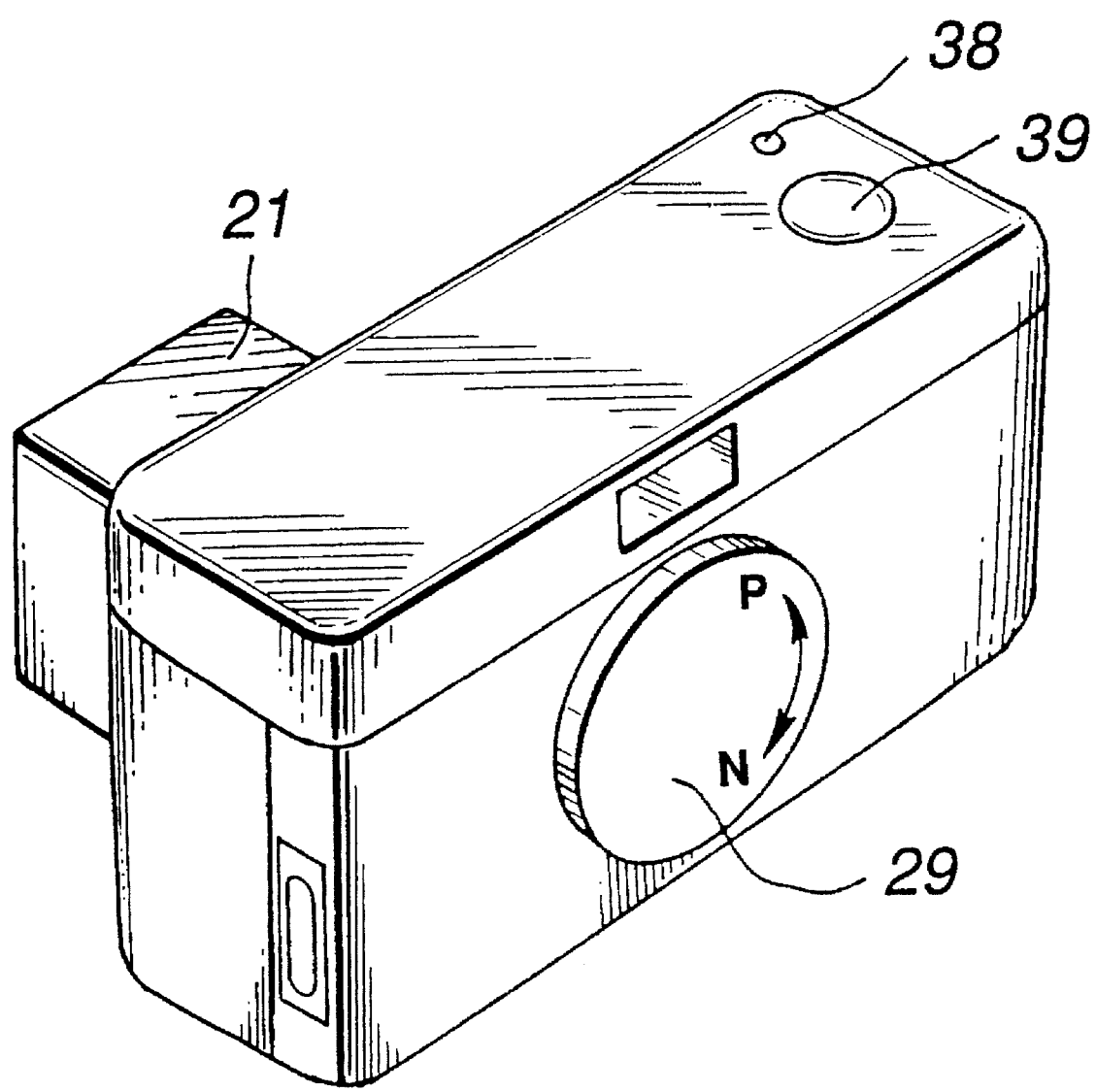
FIG. 6 is a perspective view which illustrates the camera capable of changing over the photographing frame size thereof according to the second embodiment when viewed from a position at the rear of the camera.

The frame size changing over operation according to the second embodiment will now be described with reference to FIGS. 5A to 5C and FIG. 6. FIG. 5A illustrates a photography preparation state prior to taking a photograph. FIG. 5B illustrates a normal (standard) size photographing state. FIG. 5C illustrates a panorama size photographing state. FIG. 6 is a perspective view which illustrates the shape of a camera according to the second embodiment.

When a photograph is taken, a power switch 38 disposed on the upper surface of the camera body 1A is operated to bring the camera into an operative state. In this state, the lens barrel 21 is at an initial position shown in FIG. 5A, that is, the photography preparation position so that the magnets 27a and 27b and the magnetic members 30a and 30b are magnetically connected respectively. Therefore, the masking members 25a and 25b are positioned to cover the upper and the lower portions of the aperture 1Ac.

When a photograph is taken by setting the photographing frame to the normal (standard) size, a release button 39 disposed adjacent to the power switch 38 is depressed in a state where the dial 29 is set to the normal mode. As a result, the lens barrel 21 is moved forwards for focusing (see FIG. 5B). In the state where the normal mode is set, the magnets 27a and 27b do not face the magnetic members 30a and 30b and also the magnetic connections have been suspended. Therefore, the masking members 25a and 25b are rotated to the forward upper direction and forward lower direction around the supporting shafts 32a and 32b by the urging elastic forces of the springs 26a and 26b to be moved to the outside of the optical passage. As a result, the photographing frame size is set to the normal size at the time of taking a photograph. After the photograph has been taken, the lens barrel 21 is retracted to the initial position (see FIG. 5A).

When a photograph is taken by setting the photographing frame size to the panorama size, the release button 39 is depressed in a state where the dial 29 is set to the panorama mode. As a result, the lens barrel 21 is moved forwards for focusing (see FIG. 5C). In the state where the panorama mode has been set, the magnets 27a, 27b and the magnetic members 30a and 30b respectively face one another and are magnetically connected respectively. Therefore, even if the lens barrel 21 is moved forwards, the masking members 25a and 25b are not moved against the urging elastic forces of the springs 26a and 26b. The masking members 25a and 25b are stopped at positions to cover the upper and the lower portions of the aperture 1Ac so that the opening portion of the aperture 1Ac is set to the panorama size photographing frame. Hence, a photography is taken in this state. After the photography has been taken, the lens barrel 21 is retracted to the initial position (see FIG. 5A).

The movement of the lens barrel 21 is performed by transmission of force realized when an output gear 35a of a drive motor 35 is engaged with a rack 22a formed on the bottom surface of the lens barrel 21 via a pinion gear 36.

Also the second embodiment has the arrangement that photographing frame size is changed over between the standard size and the panorama size similar to the first embodiment, the frame size is not limited to this. The arrangement of this embodiment may, of course, be adapted to a changing-over mechanism between, for example, the standard size and the half size or between the standard size and a photographing frame size lager than the standard size.

The springs 26a and 26b urge the masking members 25a and 25b in the direction in which the masking members 25a and 25b are always the normal size. The reason for this is that the normal mode is always realized even if the magnetic attraction is suspended due to shock or the like occurring in the panorama mode to always photograph an intended portion to be photographed. If the urging direction is made toward the panorama side, the panorama size frame is realized if the attractive magnetic force is suspended in the normal mode, and, accordingly, the object portion desired by the user is omitted.

Figure 7:
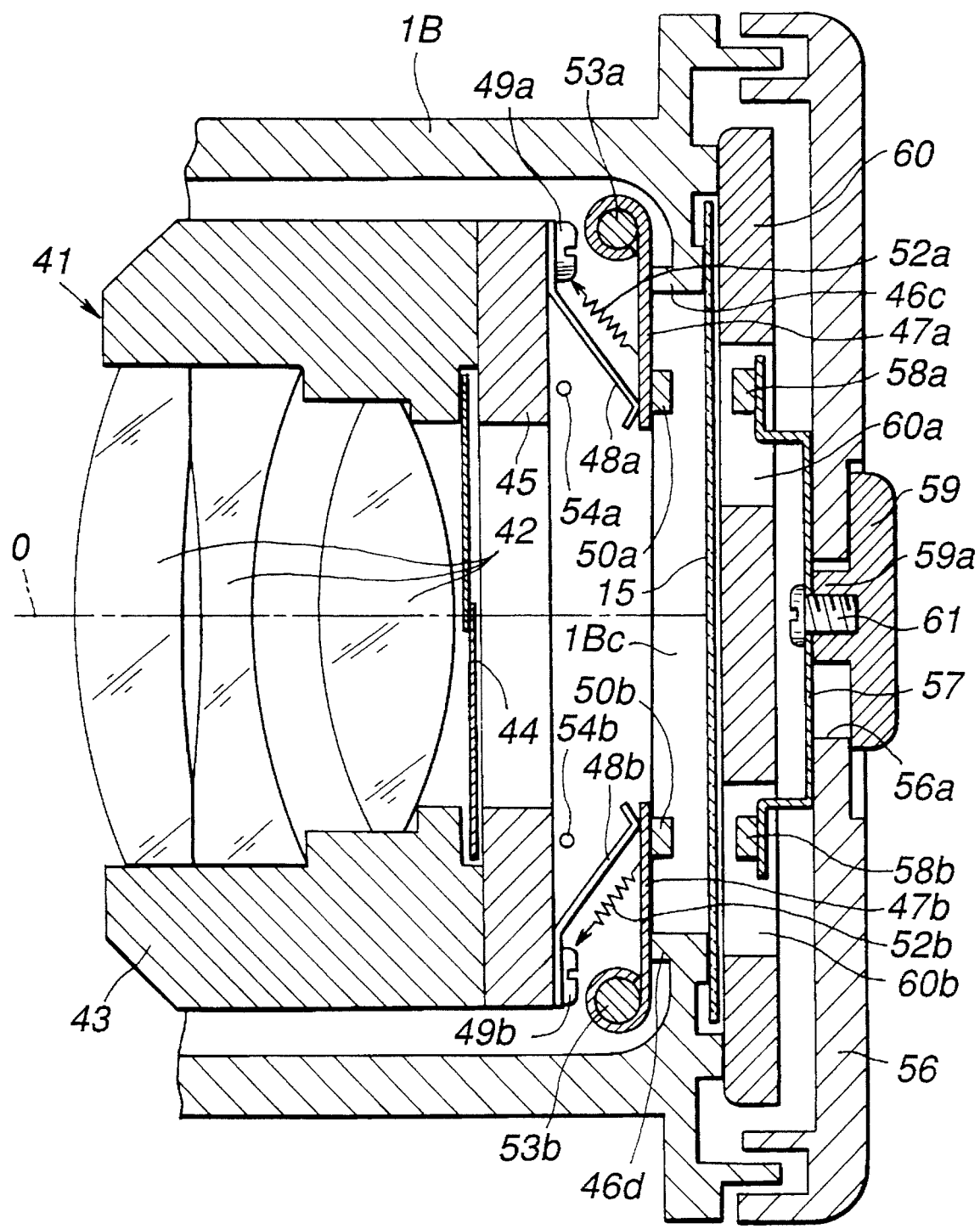
FIG. 7 is an enlarged cross sectional view which illustrates an essential portion of a camera capable of changing over the photographing frame size thereof according to a third embodiment of the present invention.
Figure 8:
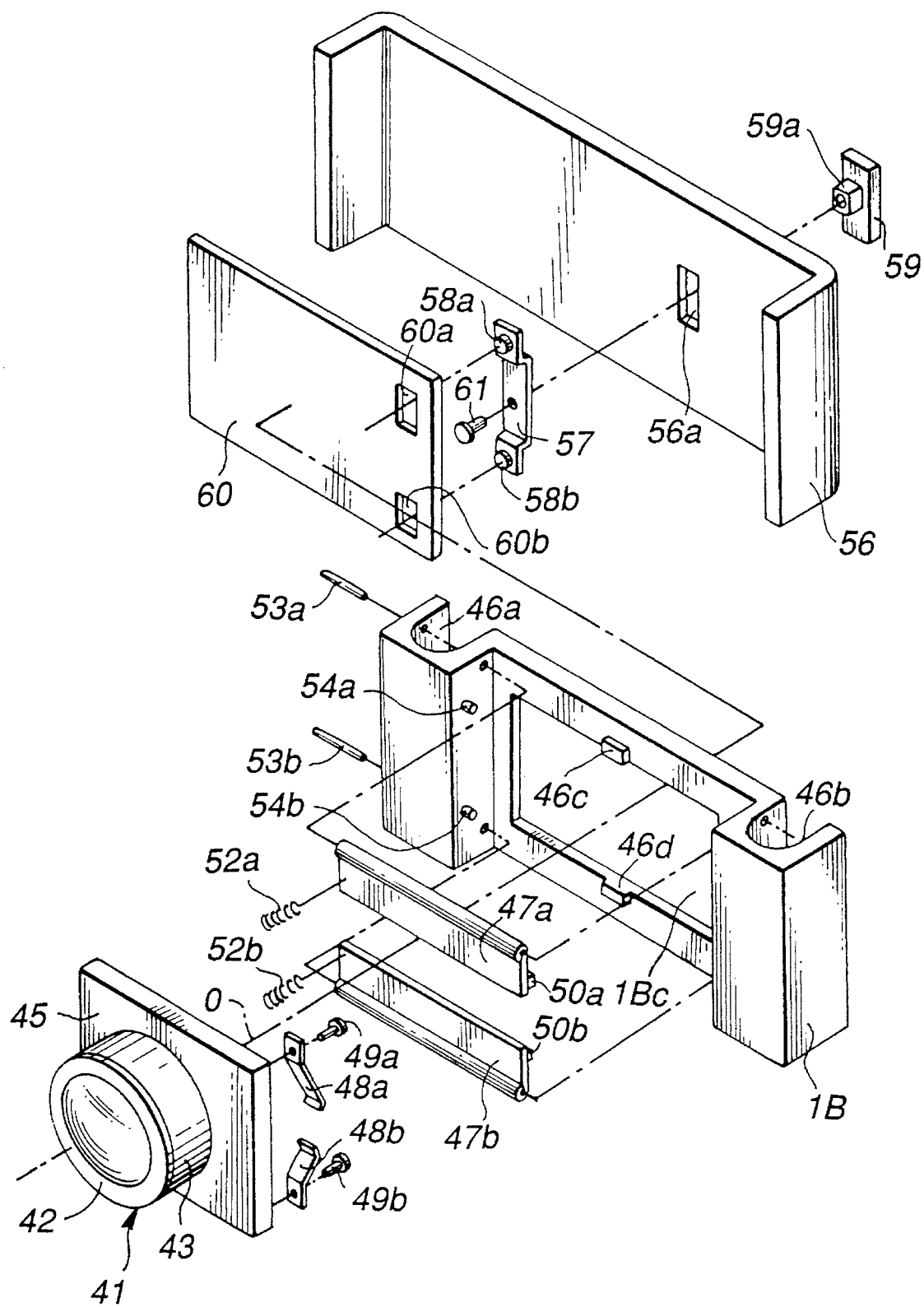
FIG. 8 is an exploded perspective view which illustrates an essential portion of the camera capable of changing over the photographing frame size thereof according to the third embodiment of the present invention.

FIGS. 7 and 8 illustrate an essential portion of a frame size restricting means of a camera capable of changing over the size of the photographing frame thereof according to a third embodiment of the present invention. Also the third embodiment has a similar arrangement to that of the second embodiment that masking members 47a and 47b are rotated to change over the photographing frame size. The differences from the restriction means according to the second embodiment are that the magnetic members are formed by magnets, the changing-over member is a slide-type member employed in place of the rotatable dial, and leaf springs 58a and 58b provided for pressing the masking members are disposed at the rear end portion of a movable lens barrel 41.

The movable lens barrel 41 is constituted by a lens holding barrel 43 supporting a photographing lens group 42, a lens shutter 44 disposed in the rear portion of the holding barrel 43, and a lens frame plate 45 to which the foregoing elements are secured and which is disposed with respect to the camera body 1B to be movable in a direction of the optical axis O. The movable lens barrel 41 is, by a drive mechanism (omitted from illustration), enabled to move to a collapsible state position shown in FIG. 7, an initial position, that is, a photography preparation state position shown in FIG. 11, and a photographing state position shown in FIGS. 12 and 13.

The frame size restriction means is disposed between the movable lens barrel 41 and an aperture 1Bc of the camera body 1B. The frame size restriction means is constituted by masking members 47a and 47b composed of a pair of vertical changing-over masking plates respectively having first magnetic members 50a and 50b each of which is made of a magnet, tension springs 52a and 52b forming a first urging means for respectively rotating the masking members 47a and 47b in a direction in which the masking members 47a and 47b move away from the film 15, and leaf springs 48a and 48b, that form a second urging means for respectively pressing the pair of the masking members 47a and 47b toward the aperture 1Bc of the camera body 1B against the tension elasticities of the springs 52a and 52b.

The pair of the vertical leaf springs 48a and 48b are disposed on either side of the rear surface of the lens frame plate 45 of the movable lens barrel 41 so that the base portions of the leaf springs 48a and 48b are, by pins 49a and 49b, secured to vertical positions at which they do not block the photographing light beam. The free ends of the leaf springs 48a and 48b face each other and diagonally extend toward rear positions in the camera. When the movable lens barrel 41 has been moved to the collapsed state position, the leaf springs 48a and 48b press the masking members 47a and 47b for restricting the frame size to the aperture 1Bc of the camera body 1B against the elasticity of the tension springs 52a and 52b, resulting in a role to retain the masking members 47a and 47b at a position at which a small exposure frame is realized.

The pair of masking members 47a and 47b are respectively made of horizontally elongated thin plates, the pair of masking members 47a and 47b being disposed so that their supporting cylindrical portions respectively formed on the top and the bottom end portions thereof are inserted by lateral supporting shafts 53a and 53b vertically disposed in the front surface of the aperture 1Bc of the camera body 1B to be rotatable around the supporting shafts 53a and 53b. The supporting shafts 53a and 53b are inserted in the top and the bottom portions of the film winding chamber 46a and a film supply chamber 46b (see FIG. 8) respectively formed in the right and the left portions of the camera body 1B so that the supporting shafts 53a and 53b are supported by the camera body 1B. The other end portions of the tension springs 52a and 52b are fastened to stationary members of the camera and are fastened to the masking members 47a and 47b not to block the photographing light beam. As a result, the masking members 47a and 47b are capable of rotating in such a manner that the upper masking member 47a is rotated clockwise and the lower masking member 47b is rotated counterclockwise around the corresponding supporting shafts 53a and 53b. Furthermore, the first magnetic members 50a and 50b are secured to end portions of the masking members 47a and 47b on the sides thereof opposing the sides that face the film 15.

The pair of masking members 47a and 47b are pressed against the aperture 1Bc by the pair of leaf springs 48a and 48b so that the central portions of the masking members 47a and 47b are brought into contact with projecting stoppers 46c and 46d formed at the central portions of the top and the bottom ends of the aperture 1Bc. When the masking members 47a and 47b are vertically stopped in parallel to the aperture 1Bc, a small exposure frame, such as the panorama size, is formed. When the upper masking member 47a is rotated clockwise and the lower masking member 47b is rotated counterclockwise around the supporting shafts 53a and 53b by the elastic forces of the tension springs 52a and 52b, the masking members 47a and 47b are removed from the aperture 1Bc, that is, the film 15, followed by stopping due to contact with the stoppers 54a and 54b provided for the camera 1B. As a result, an ordinary size large exposure frame can be formed.

The frame size is, from outside the camera, instructed by a frame size introduction means to be described later, resulting in that the frame size restriction means thus constituted is operated due to the movement of the movable lens barrel 41.

The frame size instruction means is arranged so that its essential portion is composed of a slide plate 57 disposed on the inner surface of a rear cover 56 to be slidable vertically, second magnetic members 58a and 58b secured to the slide plate 57 and made of magnets, and a changing-over member 59 for controlling the slide plate 57 from outside the camera.

The slide plate 57 is formed by forwardly bending the upper and the lower portions of a tag-like vertical plate member to have right angles, the slide plate 57 having second magnetic members 58a and 58b secured to the front surfaces of the bending portions thereof. The slide plate 57 is fastened so that it is capable of vertically sliding on the inner surface of the rear cover 56 of the camera. That is, a vertical rectangular hole 56a for holding the changing-over member 59 is formed in one side of the rear cover 56. The rectangular hole 56a receives a rectangular projection 59a formed on the inner surface of the changing-over member 59 disposed on the outer surface of the rear cover 56 in such a manner that the rectangular projection 59a is capable of moving vertically. A pin 61 inserted through the central portion of the slide plate 57 is further inserted into the rectangular projection 59a. Thus, the slide plate 57 is fastened to the rear cover 56 of the camera in such a manner that the slide plate 57 is able to move vertically.

Figure 9:
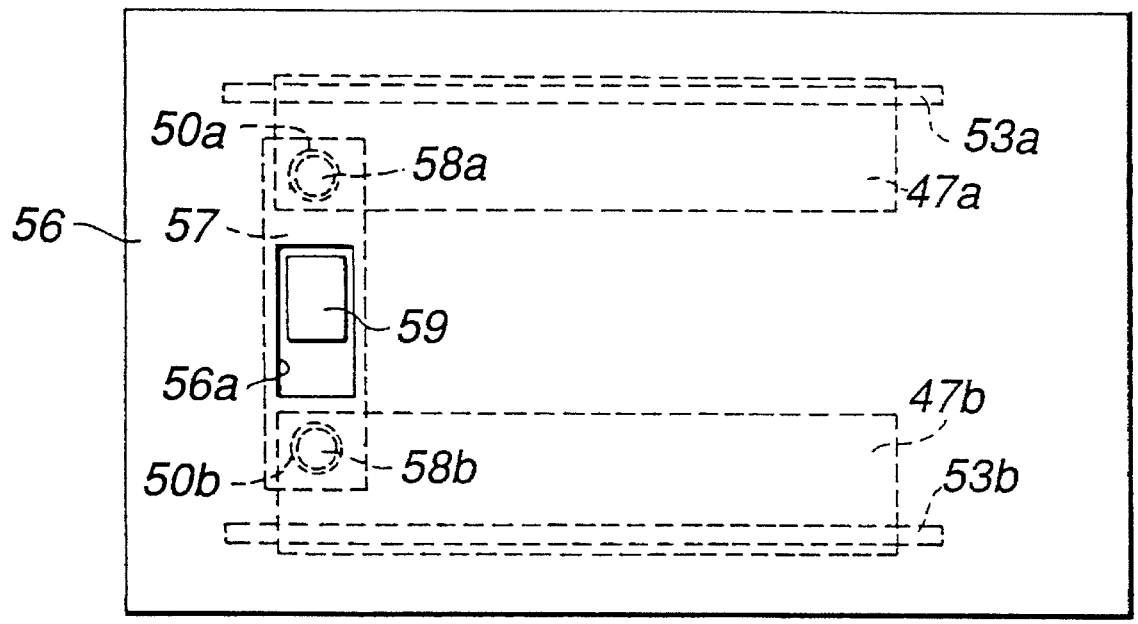
FIGS. 9 and 10 respectively are rear views which illustrate a state where a frame size changing over operation member changes over the frame size in the camera capable of changing over the photographing frame size thereof according to the third embodiment.
Figure 10:
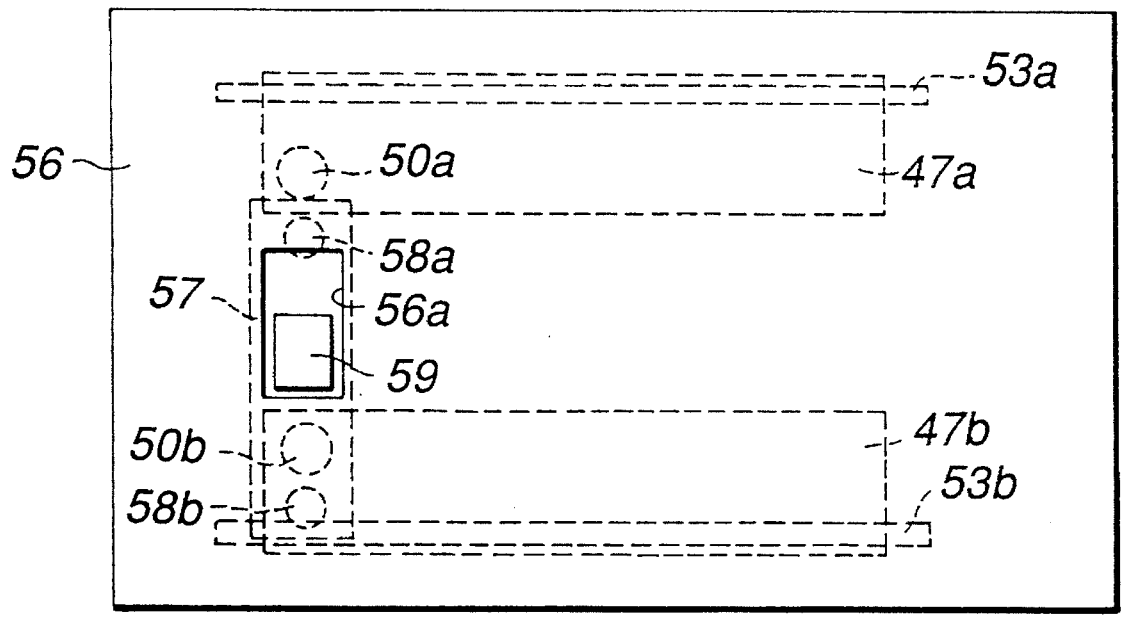

By disposing the slide plate 57 as described above, the second magnetic members 58a and 58b secured to the slide plate 57 are placed within the vertical rectangular holes 60a and 60b formed in the film pressure plate 60. As a result, the second magnetic members 58a and 58b face the first magnetic members 50a and 50b while interposing the film 15. That is, when the slide plate 57 has been moved to the upper position by operating the changing-over member 59, the second magnetic members 58a and 58b face the first magnetic members 50a and 50b as shown in FIG. 9. Since the foregoing magnetic members are magnetized in the attracting direction, the masking members 47a and 47b are maintained to that they are positioned in contact with the stoppers 46c and 46d. When the slide plate 57 has been moved to the lower position by operating the changing-over member 59, the second magnetic members 58a and 58b are brought into positions at which they do not face the first magnetic members 50a and 50b as shown in FIG. 10. Therefore, the attractive force generated by the magnetic force does not act between the foregoing magnetic members.

The operation of the thus constituted camera capable of changing over the frame size thereof according to the third embodiment will now be described. When the camera is not used, the movable lens barrel 41 is at the collapsed state position shown in FIG. 7 at which it is inserted into the camera body 1B. Therefore, the masking members 47a and 47b are pressed to the aperture 1Bc against the urging forces of the tension springs 52a and 52b by the leaf springs 48a and 48b, which have been moved into the camera body 1B together with the movable lens barrel 41. As a result, the central portions of the reverse sides of the masking members 47a and 47b are brought into contact with the stoppers 46c and 46d, resulting in stopping at positions at which they are positioned in parallel to the aperture 1Bc. Therefore, a small size exposure frame, such as the panorama size, can be formed.

Figure 11:
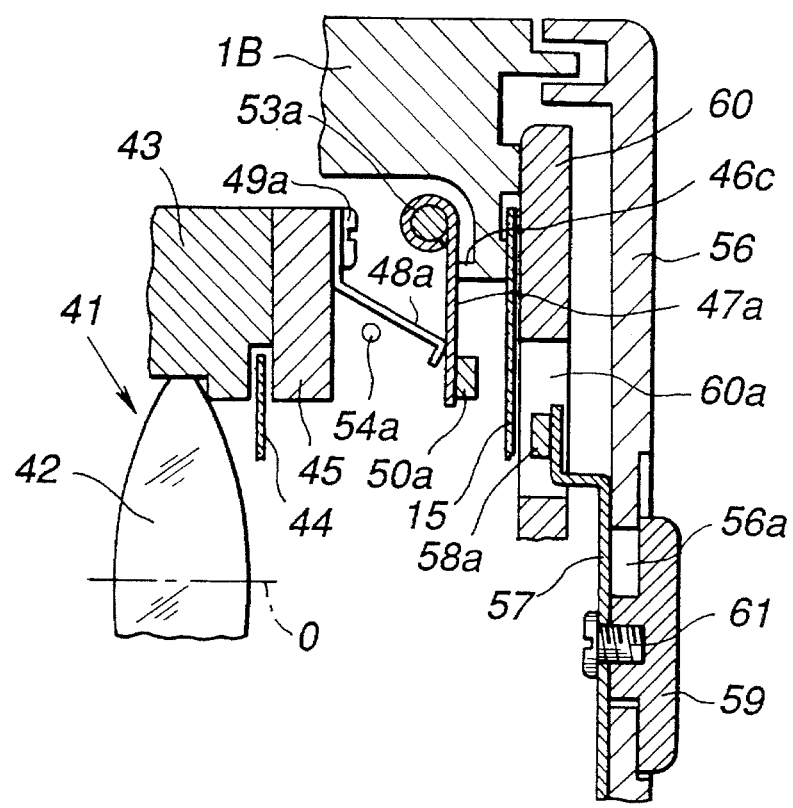
FIG. 11 is an enlarged cross sectional view which illustrates an essential portion of a state where a large exposure frame size is realized by changing and the lens barrel is in a photography preparation state in the camera capable of changing over the photographing frame size thereof according to the third embodiment.

If a full size exposure frame size photograph is intended to be taken with the foregoing camera in the foregoing state, the changing-over member 59 is operated from outside the camera to slide downwards the slide plate 57 to set the frame size to the large exposure frame size. Hence, the second magnetic members 58a and 58b are moved to the positions at which they do not face the first magnetic members 50a and 50b as shown in FIG. 11. Therefore, the attractive force generated by the magnetic force does not act between the foregoing magnetic members.

When the release button is depressed in the foregoing state where the frame size has been instructed, the movable lens barrel 41 is brought into the collapsed state position shown in FIG. 7 to the initial position, that is, the photography preparation state position shown in FIG. 11. Since the leaf springs 48a and 48b still press the masking members 47a and 47b in the foregoing state, the masking members 47a and 48b are maintained at the positions at which they are in contact with the stoppers 46c and 46d even if the attractive forces of the magnetic members 58a, 58b, 50a and 50b do not act.

Figure 12:
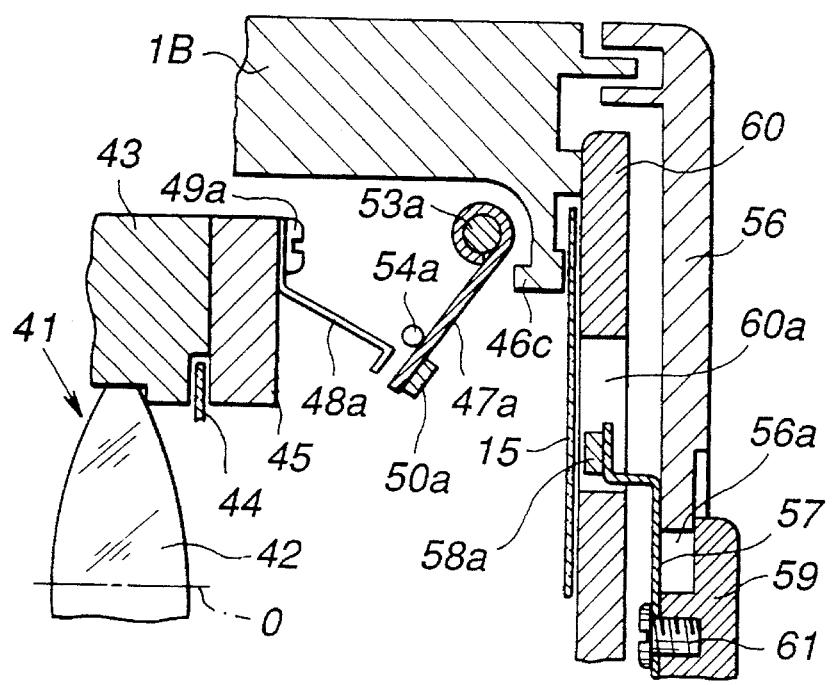
FIG. 12 is an enlarged cross sectional view which illustrates an essential portion of a state where a large exposure frame size is realized by changing and the lens barrel has been moved to a focusing position in the camera capable of changing over the photographing frame size thereof according to the third embodiment.

When the movable lens barrel 41 has been moved to the focusing position in the photographing state shown in FIG. 12, the leaf springs 48a and 48b are removed from the masking members 47a and 47b. Therefore, the masking members 47a and 47b follow the movements of the leaf springs 48a and 48b to be rotated in such a manner that the upper one is rotated clockwise and the lower one is rotated counterclockwise around the supporting shafts 53a and 53b by the tension springs 52a and 52b, resulting in the stoppages of the masking members 47a and 47b at the positions at which they are positioned in contact with the stoppers 54a and 54b. The foregoing positions are the positions at which the full size exposure frame size is set and at which the angle of view of the photographing light beam made from the film 15 is enlarged.

When the photography has been completed at the foregoing positions, the movable lens barrel 41 is returned to the initial position, which is the photography preparation state position shown in FIG. 11.

When a next photograph is intended to be taken with the panorama size exposure frame size, the changing-over member 59 is operated from the outside of the camera to slide the slide plate 57 upwards and to instruct a small size exposure frame size. As a result, the second magnetic members 58a and 58b face the first magnetic members 50a and 50b as shown in FIG. 7. Therefore, the attractive force due to the magnetic force acts to maintain the masking members 47a and 47b at the positions at which they are in contact with the stoppers 46c and 46d. That is, the masking members 47a and 47b are pressed to the aperture 1Bc against the elasticities of the tension springs 52a and 52b by the urging forces of the leaf springs 48a and 48b generated due to the movement of the lens barrel 41 to the initial position, which is the photography preparation state position. As a result, the central portions of the masking members 47a and 47b are brought into contact with the stoppers 46c and 46d so that they are stopped at the positions at which they are in parallel to the aperture 1Bc. Therefore, a small exposure frame size, such as the panorama size, is formed.

Figure 13:
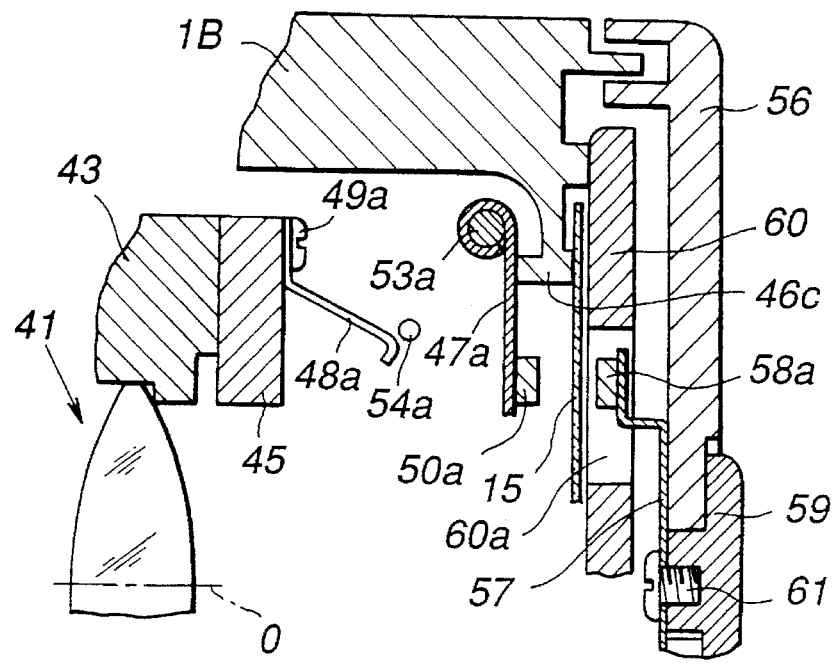
FIG. 13 is an enlarged cross sectional view which illustrates an essential portion of a state where a small exposure frame size is realized by changing and the lens barrel has been moved to a focusing position in the camera capable of changing over the photographing frame size thereof according to the third embodiment.

When the movable lens barrel 41 has been moved to the focusing position in the photographing state as shown in FIG. 13, the leaf springs 48a and 48b are removed from the masking members 47a and 47b. However, the second magnetic members 58a and 58b of the masking members 47a and 47b face the first magnetic members 50a and 50b and, accordingly, the attractive magnetic forces acts. Therefore, the masking members 47a and 47b are stopped to be in parallel to the aperture 1Bc, causing a small exposure frame size, such as the panorama size, to be formed. When a photograph has been taken in the foregoing state, the movable lens barrel 41 is, therefore, returned to the photography preparation state position shown in FIG. 11.

As described above, according to the third embodiment, changing over between the large exposure frame size and a smaller exposure frame size can be assuredly performed while requiring a simple changing-over mechanism.

FIGS. 14, 15, 16A and 16B illustrate an essential portion of a camera capable of changing over the frame size thereof according to a fourth embodiment of the present invention, where the movable lens barrel is at the collapsed state position.

Figure 14:
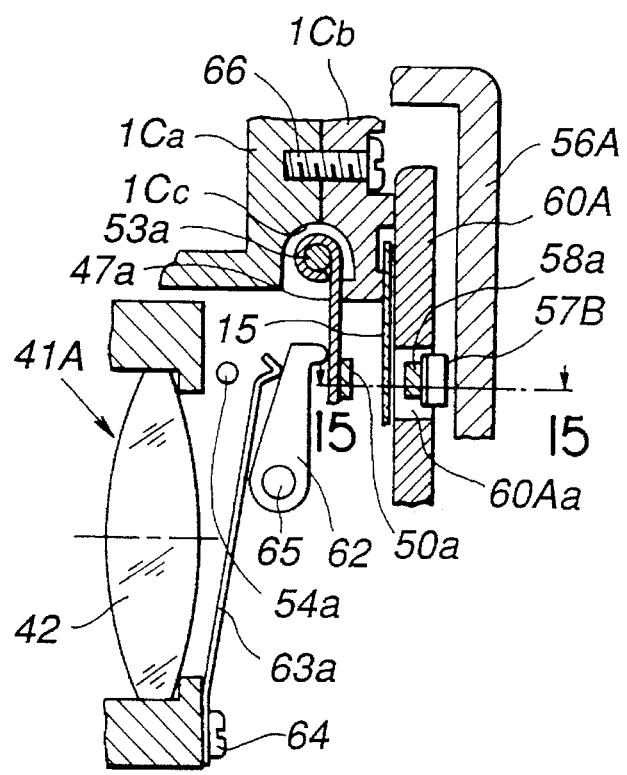
FIG. 14 is an enlarged cross sectional view which illustrates an essential portion of a camera capable of changing over the photographing frame size thereof according to a fourth embodiment of the present invention.
Figure 15:
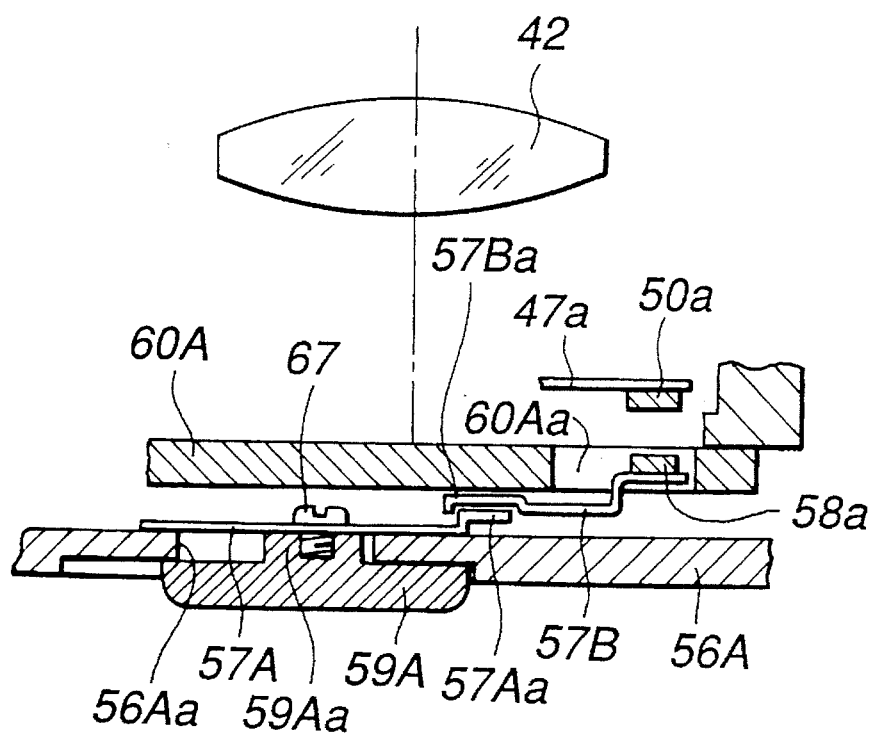
FIG. 15 is an enlarged cross sectional view taken along line 15—15 of FIG. 14.

Although FIG. 14 illustrates only the upper half portion of the frame size changing-over mechanism, the lower half portion is constituted symmetrically to the upper half portion. FIG. 15 illustrates only the upper half portion of a frame size instruction means, while a similar mechanism is also disposed in the lower half portion so that it is operated by a changing-over member 59A.

The fourth embodiment is different from the third embodiment in that a connection arm 62 serving as a connection member is disposed between the masking member 47a and a leaf spring 63a, that the camera body is divided into two sections at a position adjacent to a supporting shaft 53a to constitute the camera body by camera bodies 1Ca and 1Cb, and that the changing-over member 59A and a slide plate 57A are disposed movably in a horizontal direction with respect to a rear cover 56A of the camera to operate the changing-over member 59A in the lateral direction.

The leaf spring 63a has a long length to have the base portion secured to the lower portion of a rear surface of the movable lens barrel 41A by a pin 64. The leading portion of the leaf spring 63a is extended between the masking member 47a and the upper portion of the rear surface of the movable lens barrel 41A. The leading portion of the connection arm 62 extends between the leading portion of the leaf spring 63a and the masking member 47a to be held between them. The connection arm 62 is rotatably supported by a supporting shaft 65 at the base portion thereof.

Since the foregoing structure is arranged so that the leaf spring 63a and the masking member 47a are positioned in contact with each other while interposing the connection arm 62, the leaf spring 63a is moved forwards together with the movable lens barrel 41A in the photographing state. If the first magnetic member 50a and the second magnetic member 58a are in the adsorption suspended state, that is, if a large exposure frame size is instructed, the masking member 47a is rotated clockwise to a predetermined position at which it is in contact with the stopper 54a while rotating the connection arm 62 counterclockwise around the supporting shaft 65.

By performing the rotation while interposing the connection arm 62, the mask member can be moved while reducing the amount of the movement of the spring. Therefore, the rotational angle of the mask member can be set to a predetermined angle regardless of the amount of the forward movement of the movable lens barrel 41A. Furthermore, the mask member can easily be returned. The fourth embodiment has the arrangement that the camera body is divided into a front camera body 1Ca and a rear camera body 1Cb at a position adjacent to the supporting shaft 53a of the masking member 47a, the two camera bodies 1Ca and 1Cb being connected to each other by a pin 66. By dividing the camera body into the two sections, a cut portion 1Cc can be formed in the portion in which the camera body 1Ca and the camera body 1Cb are connected to each other to dispose the supporting shaft 53a of the masking member 47a within the cut portion 1Cc. Therefore, the area required to dispose the supporting shaft 53a can be reduced, resulting in an advantage that the size of the camera can be reduced.

Figure 16A:
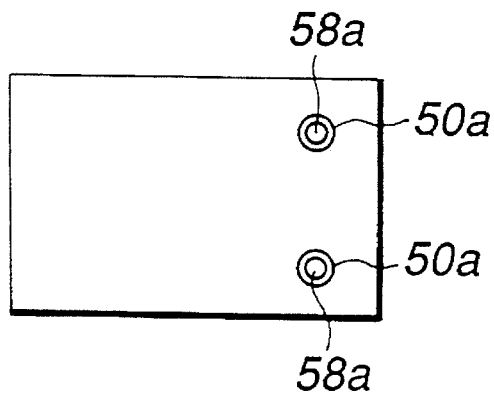
FIGS. 16A and 16B respectively are rear views which illustrate the position of a second magnetic member with respect to a first magnetic member in the camera capable of changing over the photographing frame size thereof according to the fourth embodiment.
Figure 16B:
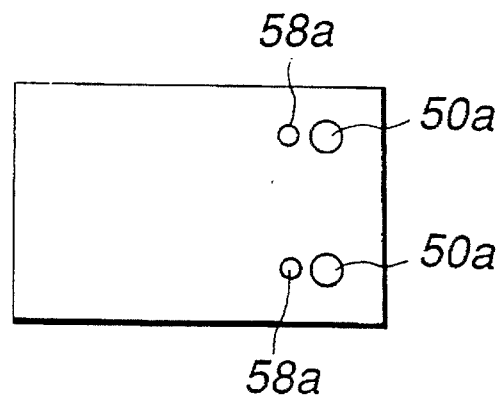

Furthermore, this embodiment has the arrangement that the changing-over member 59A and the slide plates 57A and 57B are moved in the lateral direction with respect to the rear cover 56A of the camera as shown in FIGS. 15, 16A and 16B. The slide plate is divided into two sections, that is, the slide plates 57A and 57B having the arrangement that the slide plate 57A is disposed adjacent to the rear cover 56A and the slide plate 57B is disposed adjacent to the pressure plate 60A, the two slide plates 57A and 57B being slidably fastened to be connected to each other.

That is, a rectangular hole 56Aa for fastening the changing-over member is formed laterally in the rear cover 56A. Furthermore, the laterally rectangular slide plate 57A is, by a pin 67, fastened to the inner surface of a rectangular projection 59Aa of the changing-over member 59A received by the rectangular hole 56Aa. The slide plate 57A comprises a connection portion 57Aa having an L-shaped end portion formed by bending the end portion extending toward the position at which the first magnetic member 50a is disposed. The connection portion 57Aa is connected to a connection portion 57Ba of the slide plate 57B disposed slidably in the lateral direction on the rear side of the pressure plate 60A by a fastening member (omitted from illustration). The slide plate 57B is made of a lateral tag-like plate having channel-shaped connection portion 57Ba, the depth of which is shallow. The outer end portion of the slide plate 57B is bent to have an L-shape to support the second magnetic member 58a, the outer end portion being received within the laterally-rectangle hole 60Aa formed in the film retaining pressure plate 60A at a position facing the first magnetic member 50a.

By constituting the frame size instruction means by the changing-over member 59A composed of the changing-over knob and the slide plates 57A and 57B to be arranged slidable in the horizontal direction with respect to the rear cover 56A of the camera and by operating the changing-over member 59A in the lateral direction, the exposure frame size is instructed. Since the slide plate is divided into the two sections, an advantage can be obtained in that the interval between the two facing magnetic members 50a and 58a can stably be maintained even if the vertical position of the rear cover 56A with respect to the pressure plate 60A is deviated from an intended position.

Although the third and the fourth embodiments have the arrangement that the first magnetic members 50a and 50b are secured to the surfaces of the masking members 47a and 47b that face the film, they may be secured to the surfaces of the masking members 47a and 47b that face the lens to obtain a similar operation and effect.

Figure 17:
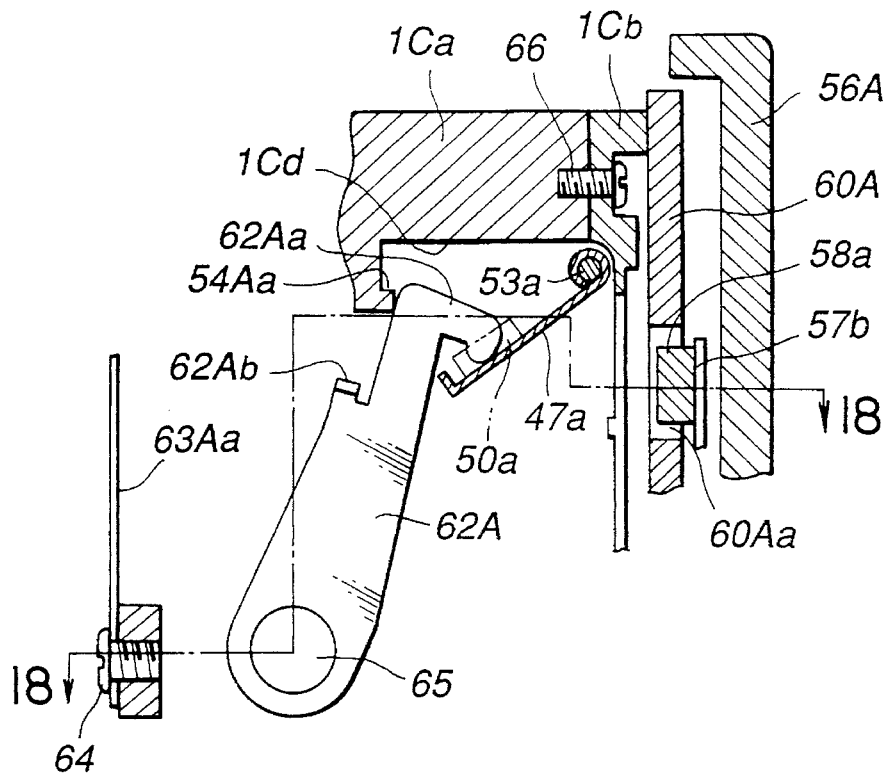
FIG. 17 is an enlarged cross sectional view which illustrates an essential portion of a camera capable of changing over the photographing frame size thereof according to a fifth embodiment of the present invention.

Then, a camera capable of changing over the photographing frame size according to a fifth embodiment of the present invention shown in FIGS. 17, 18 and 19 will be described. The fifth embodiment has an arrangement that the first magnetic member 50a (50b) is secured to the surface of the masking member 47a (47b) facing the lens. Furthermore, a display window 68 formed in the rear cover 56A displays the frame size realized by changing. Since the other structures are the same as those of the camera capable of changing over the frame size according to the fourth embodiment, the same elements are given the same reference numerals and their descriptions are omitted. Therefore, only different structures will now be described.

The camera according to the fifth embodiment has the arrangement that the first magnetic member 50a (50b) is secured to the surface of the masking member 47a (47b) that faces the lens. Furthermore, the cut portion 1Cc in which the supporting shaft 53a of the masking member 47a is disposed is replaced by a cut portion 1Cd having a larger width. The cut portion 1Cd receives the supporting shaft 53a and a leading portion 62Aa of the connection arm 62A rotatably supported by the supporting shaft 65 at the base portion thereof, the leading portion 62Aa being bent to have an L-shape. Furthermore, the cut portion 1Cd has a stopper 54Aa on the inner wall thereof that faces the lens. The leading portion 62Aa extends between the stopper 54Aa and the masking member 47a. The rotation of the masking member 47a and the separation of the leaf spring 63Aa that moves together with the lens barrel 41A cause the connection arm 62A to swing around the supporting shaft 65. It should be noted that the connection arm 62A has a bent member 62Ab formed at the free end thereof to be pressed by the leaf spring 63Aa so that the connection arm 62A is moved.

Figure 18:
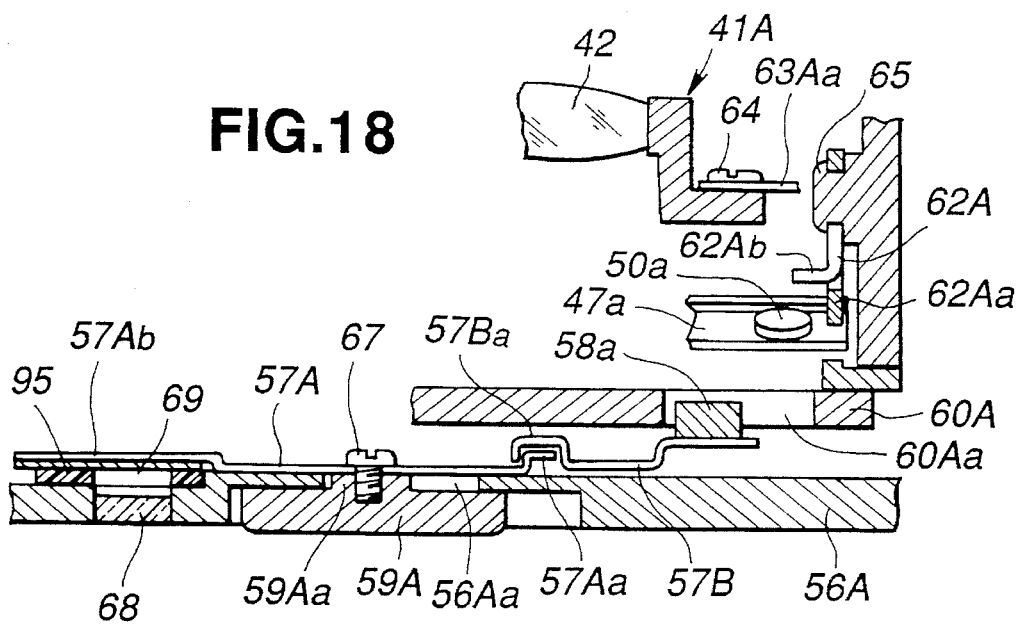
FIG. 18 is a cross sectional view taken along line 18—18 of FIG. 17.
Figure 19:
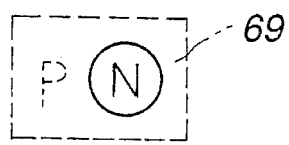
FIG. 19 is a front elevational enlarged view which illustrates an example of display of changed frame size in the camera capable of changing over the photographing frame size thereof according to the fifth embodiment.

As shown in FIG. 18, the slide plate 57A further extends to the left portion to form an extending portion 57Ab while exceeding the changing-over member 59A. The rear cover 56A has, at the position thereof facing the extending portion 57Ab, the display window 68 in which a transparent member is received. On the rear side of the extending portion 57Ab, that faces the display window 68, an indication sheet 69 is bonded on which, for example, character "N" indicating the full size photographing frame and character "P" indicating the panorama size photographing frame are printed as shown in FIG. 19. A light shielding member 95 made of molt plane or the like for preventing invasion of undesirable light through the indication window 68 is bonded to the rear cover 56A at a position adjacent to the front surface of the indication sheet 69.

The thus constituted camera according to the fifth embodiment is able to change over the frame size similar to the camera according to the fourth embodiment. Furthermore, the movement of the slide plate 57A realized by the changing-over member 59A causes the changed size of the photographing frame to be displayed in the indication window 68. Therefore, the exposure frame size can be confirmed from the outside of the camera.

Since the fifth embodiment has the arrangement that the first magnetic member 50a (50b) is secured to the surface of the masking member 47a (47b) facing the lens, the first magnetic member 50a (50b) and its adhesive agent cannot be looked by a user in a state where the rear cover 56A is opened. Therefore, the quality of the appearance of the inner portion of the camera can be improved. Furthermore, deterioration in the image quality due to the internal reflection from the magnetic members can be prevented in a state where a large frame size is selected.

Figure 20:
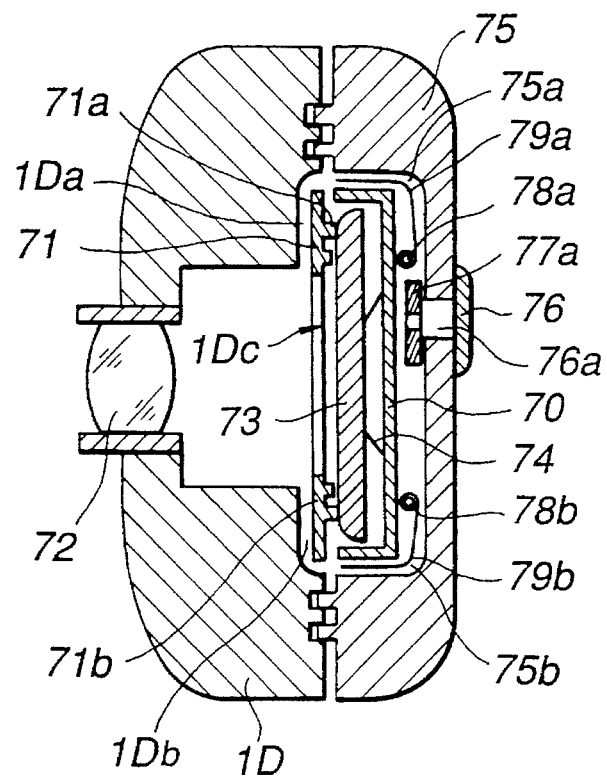
FIG. 20 is a schematic cross sectional view which illustrates the time of taking a full size photograph with a camera capable of changing over the photographing frame size thereof according to a sixth embodiment of the present invention.
Figure 21:
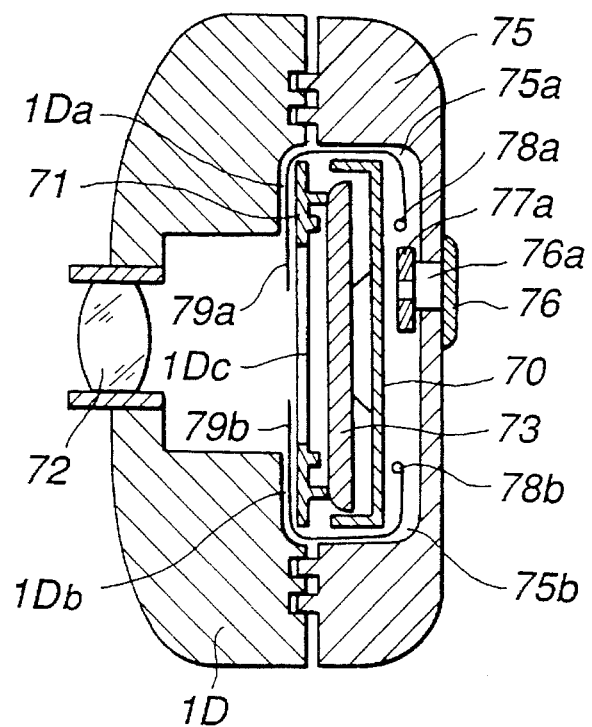
FIG. 21 is a schematic cross sectional view which illustrates the time of taking a panorama size photograph with the camera capable of changing over the photographing frame size thereof according to the sixth embodiment.

FIGS. 20 and 21 illustrate an essential portion of a camera capable of changing over the photographing frame size thereof according to a sixth embodiment of the present invention. FIG. 20 illustrates a state where a full (standard)

size photograph is taken. FIG. 21 illustrates a state where a panorama size photograph is taken.

The foregoing embodiments have the arrangement that the frame size changing-over mechanism disposed in the camera body is operated by the frame size changing-over operation means which is disposed on the rear cover of the camera and which utilizes magnetic connection force. In contrast with them, the sixth embodiment is considerably different from the foregoing embodiments in that also the frame size changing-over mechanism is disposed in the rear cover.

As shown in FIGS. 20 and 21, the camera capable of changing over the photographing frame size according to this embodiment has a usual photographing function. A camera body 1D having a photographing optical system 72 has a rear cover 75 which can be opened/closed. Similar to each of the foregoing embodiments, the photographing frame size can be controlled by an aperture 1Dc. The aperture 1Dc is formed in an aperture forming member 71 fastened integrally with the camera body 1D. The aperture forming member 71 further includes film rails 71b on the top and the bottom end portions of the aperture 1Dc and pressure plate rails 71a disposed outside the film rails 71b.

In addition, movement passages 1Da and 1Db for a pair of masking members 79a and 79b disposed vertically and to be described later are formed between the position in front of the upper portion of the aperture forming member 71 and the camera body 1D and between the position in front of the lower portion of the same and the camera body 1D.

On the other hand, the rear cover 75 includes a pressure-plate fastening member 70 secured therein. In addition, an upper movement passage 75a and a lower movement passage 75b for disposing and moving the masking members 79a and 79b comprising masking sheets made of thin soft members having spring characteristics are disposed between the rear side of the pressure-plate fastening member 70 and the inner surface of the rear cover 75. Further, a pressure plate 73 is elastically supported in front of the pressure-plate fastening member 70 by a pressure-plate spring 74. The pressure plate 73 is brought into contact with the pressure plate rails 71a as illustrated when the rear cover 75 is closed so that the film passage is formed in cooperation with the film rails 71b.

The two passages 75a and 75b respectively are formed by forwardly bending their upper portions and the lower portions to make a substantially right angle. The leading portions of the passages 75a and 75b respectively are connected to the movement passages 1Da and 1Db of the camera body 1D. The masking members 79a and 79b are made of light shielding and flexible sheet-like members, the masking members 79a and 79b having base portions which are secured to an upper winding shaft 78a and a lower winding shaft 78b disposed in the passages 75a and 75b formed on the rear side of the pressure-plate fastening member 70, followed by winding the base portions around the two winding shafts 78a and 78b.

Figure 22:
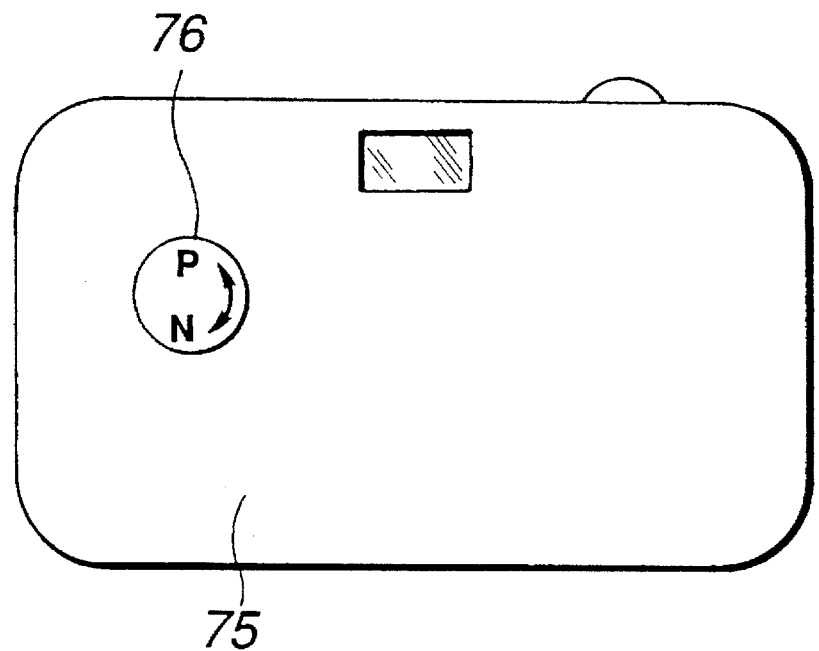
FIG. 22 is a rear view which illustrates an essential portion of the camera capable of changing over the photographing frame size thereof according to the sixth embodiment.
Figure 23:
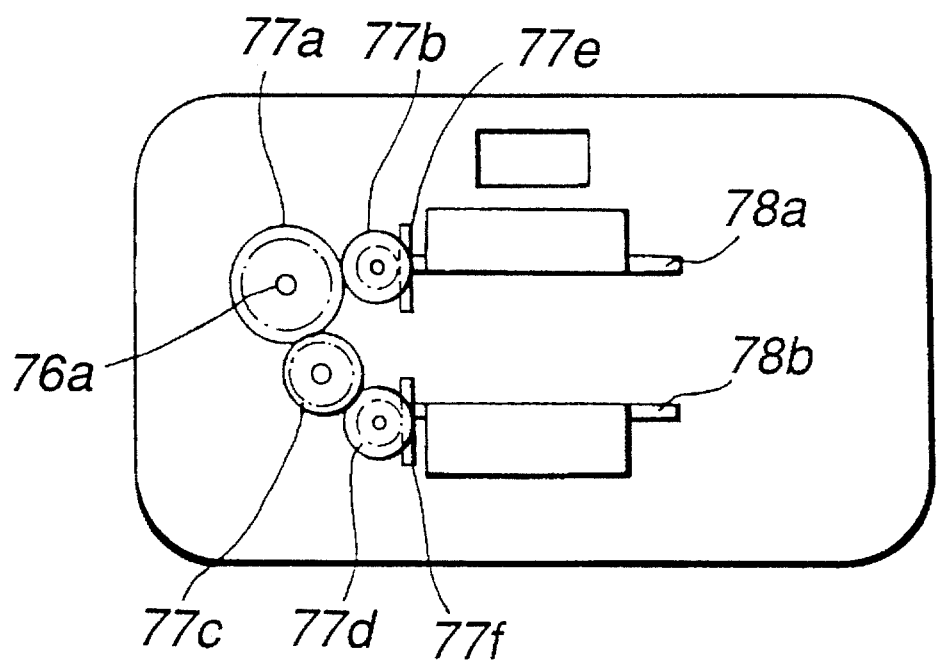
FIG. 23 is a schematic projection view which illustrates the structure of an essential portion of the camera capable of changing over the photographing frame size thereof according to the sixth embodiment when viewed from a position in the rear of the camera.

On the other hand, an operation dial 76 urged by a toggle spring (omitted from illustration) is rotatably disposed on the outer surface of the rear side of the rear cover 75. The operation dial 76 has an arrangement that it is operated at a position on the rear side of the camera as shown in FIG. 22. The operation dial 76 has a rotation central shaft 76a which penetrates the rear cover 75 to reach a position inside the rear cover 75 (see FIGS. 20 and 21). The leading portion of the central shaft 76a has a drive gear 77a secured thereto, the drive gear 77a receiving transmission gears 77b and 77c engaged thereto as shown in FIG. 23. A bevel gear 77e secured to an end portion of the upper winding shaft 78a engages the transmission gear 77b. A bevel gear 77f secured to an end portion of the lower winding shaft 78b is driven by the remaining transmission gear 77c via an idle gear 77d.

The thus constituted camera capable of changing over the frame size according to the sixth embodiment has an arrangement that the masking members 79a and 79b respectively are wound around the upper winding shaft 78a and the lower winding shaft 78b as shown in FIG. 20 when the camera is in the normal mode. Furthermore, the leading portions of the masking members 79a and 79b are positioned within the passages 75a and 75b of the rear cover 75. Therefore, the photographing frame size in the foregoing state is a full size due to the action of the aperture 1Dc.

When the panorama size photographing frame is realized, the operation dial 76 is rotated in direction P shown in FIG. 22 against the urging force of the toggle spring. When the operation dial 76 has moved over a neutral point for the toggle spring, the dial 76 is instantly rotated in the direction P due to the urging force of the toggle spring. As a result, the gears 77a to 77f are rotated, causing the masking members 79a and 79b to be moved into the movement passages 1Da and 1Db in the camera body. The thus moved masking members 79a and 79b have the arrangement that their leading portions are stopped at positions at which they cover top and bottom end portions of the front surface of the aperture 1Dc as shown in FIG. 21. The frame size of the aperture 1Dc covered with the masking members 79a and 79b forms the panorama size photographing frame.

Therefore, a panorama size photograph is taken under the foregoing state. When a full size photographing frame is realized from the foregoing state, the operation dial 76 is rotated in a direction N (see FIG. 22) to perform an operation reverse that described above so that the masking members 79a and 79b are wound around the corresponding upper winding shaft 78a and the lower winding shaft 78b as shown in FIG. 20. Therefore, the leading portions of the masking members 79a and 79b are positioned within the passages 75a and 75b of the rear cover 75. As a result, the full size frame restricted by only the aperture 1Dc is realized.

As described above, according to the sixth embodiment, the arrangement that the photographing frame size changing-over operation means is disposed in the rear cover will provide the camera capable of changing over the photographing frame size thereof only by interchanging the rear cover and by forming the movement passages 1Da and 1Db for the masking members 79a and 79b.

Then, an embodiment of the camera capable of changing over the photographing frame size thereof will be described with reference to FIGS. 24 to 29, the camera according to this embodiment having an arrangement that the photographing frame size is changed over from outside of the camera by utilizing magnets, wherein the selected photographing frame size can be instantaneously recognized.

Figure 24:
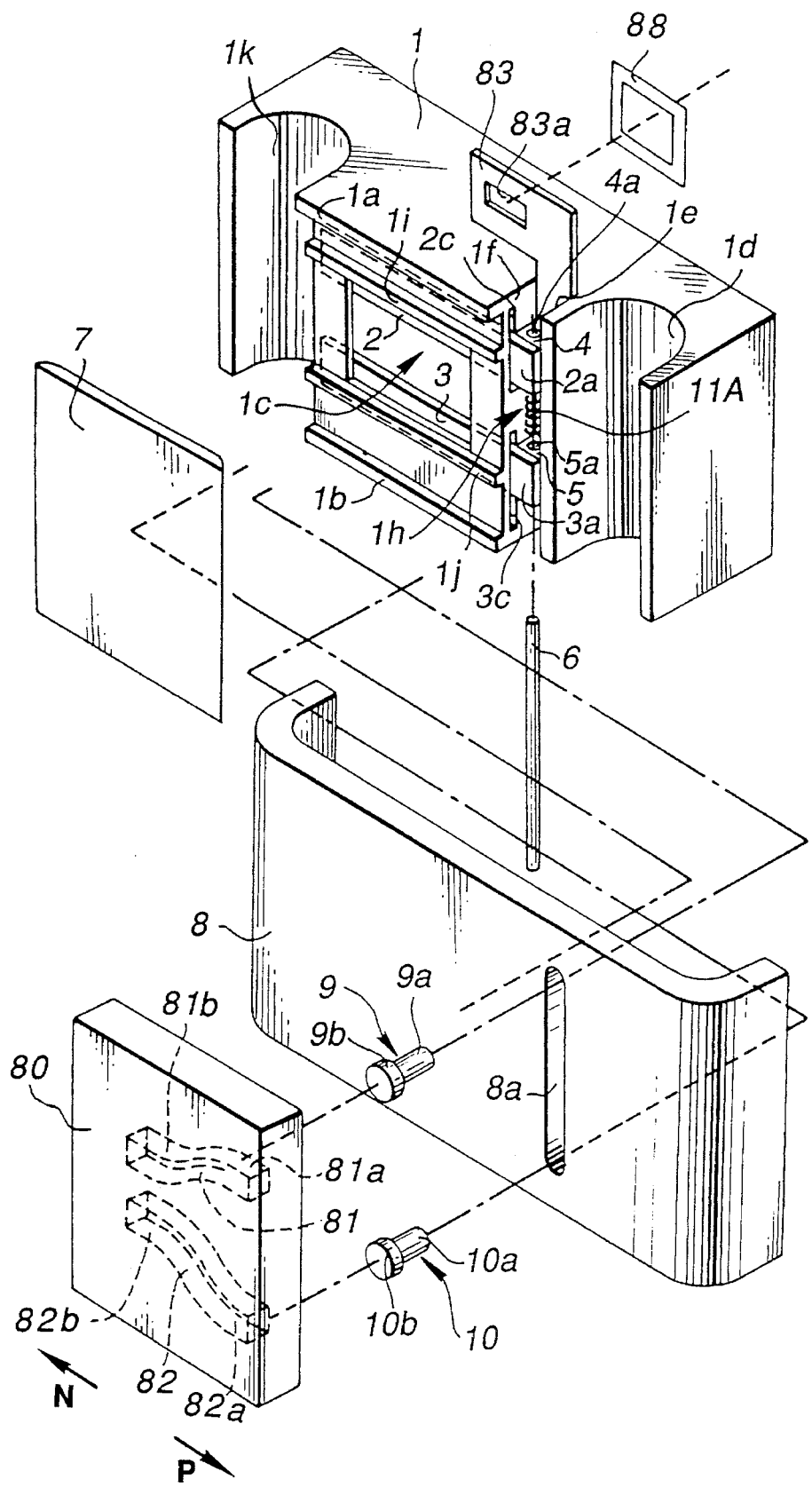
FIG. 24 is an exploded perspective view which illustrates an essential portion of a camera capable of changing over the photographing frame size thereof according to a seventh embodiment of the present invention.

The camera capable of changing over the frame size thereof according to a seventh embodiment of the present invention, as shown in FIG. 24, comprises a frame size changing-over mechanism and a frame size changing-over operation means that are structured to be substantially similar to those of the changing-over camera according to the first embodiment of the present invention shown in FIG. 1. Therefore, the same elements are given the same reference numerals, their descriptions are omitted here, and only the different structures will now be described.

The seventh embodiment has an arrangement that an extensive coil spring 11A wound around the guide shaft 6 is disposed between the two mask supporting members 4 and 5. The two mask supporting member 4 and 5 are urged in directions opposing each other due to the extensive elasticity of the coil spring 11A. The magnets 9 and 10 constituting the magnetic connection means are not connected to each other by the contractive coil spring 11 (see FIG. 1). In the central portion of the front surface of a changing-over member 80 serving as a frame size changing-over operation means disposed on the rear side of the rear cover 8, a cam groove recess 81 rising toward either end portion and a cam groove recess 82 disposed below the cam groove recess 81 and lowering toward the end portion are disposed to face each other. The foregoing magnets 9 and 10 are movably received within a pair of the cam groove recesses 81 and 82 disposed vertically.

The seventh embodiment having the arrangement that the structures of the frame size changing-over mechanism and the changing-over operation means are partially different from those of the first embodiment comprises a notifying means for notifying the photographing frame size selected by changing.

Figure 25:
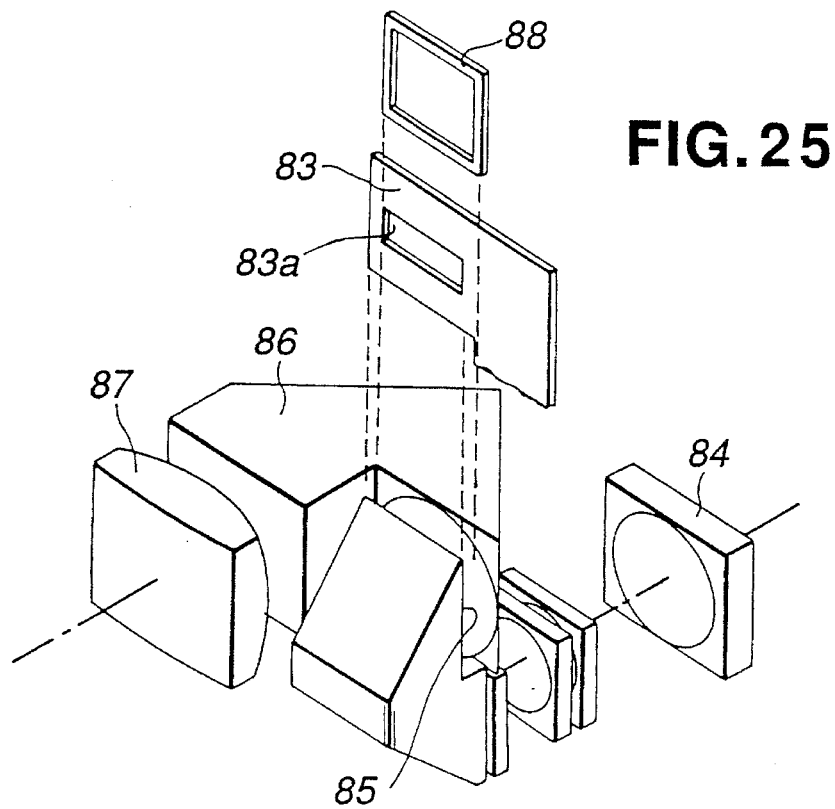
FIG. 25 is an enlarged perspective view which illustrates a finder optical system of the camera capable of changing over the photographing frame size thereof according to the seventh embodiment.

The notifying means comprises a panorama visual field frame member 83 to be introduced/removed from a finder optical system to display the visual field frame at the time of taking a panorama size photograph. The finder optical system comprises a real image type finder constituted by an objective lens 84, a first prism 85, a second prism 86 and an ocular lens 87 as shown in FIG. 25. A full-size visual field frame member 88 is disposed in front of the imaging surface of the first prism 85 to determine the visual field frame at the time of taking a full size photograph. The panorama visual field frame member 83 is inserted/removed to and from the rear side of the full-size visual field frame member 88 in synchronization with the change in the photographing frame size.

Figure 26:
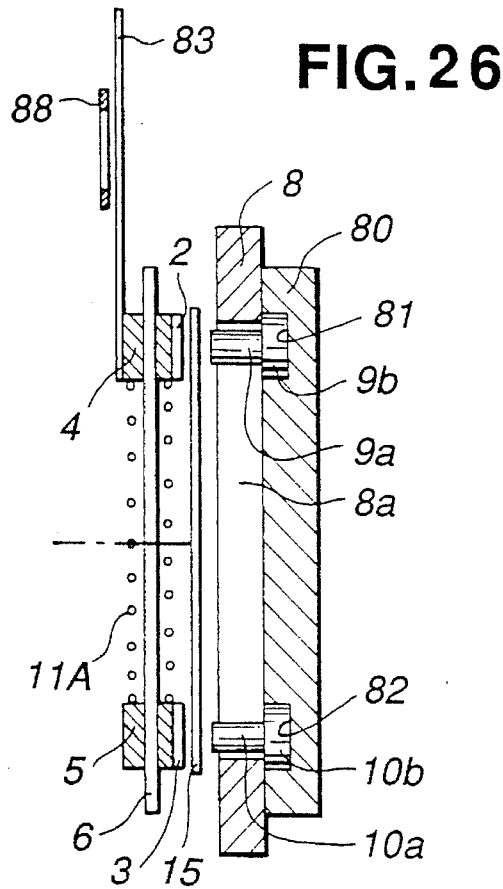
FIG. 26 is an enlarged cross sectional view which illustrates an essential portion of a state where the photographing frame size is changed to a full size in the camera capable of changing over the photographing frame size thereof according to the seventh embodiment.

The base portion of the panorama visual field frame member 83 is, as shown in FIGS. 24 and 26, secured to the front surface of the upper mask supporting member 4 of the mask supporting members 4 and 5, that is, to the surface of the mask supporting member 4 opposing the surface to which the masking member 2 is secured.

Figure 27:
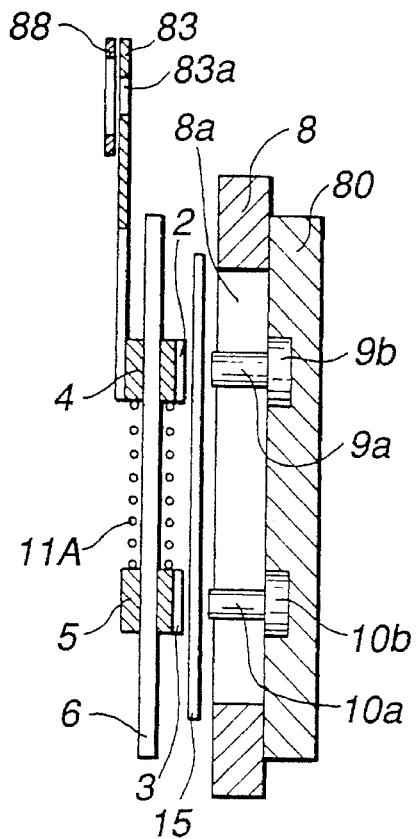
FIG. 27 is an enlarged cross sectional view which illustrates an essential portion of a state where the photographing frame size is changed to the panorama size in the camera capable of changing over the photographing frame size thereof according to the seventh embodiment.
Figure 28:
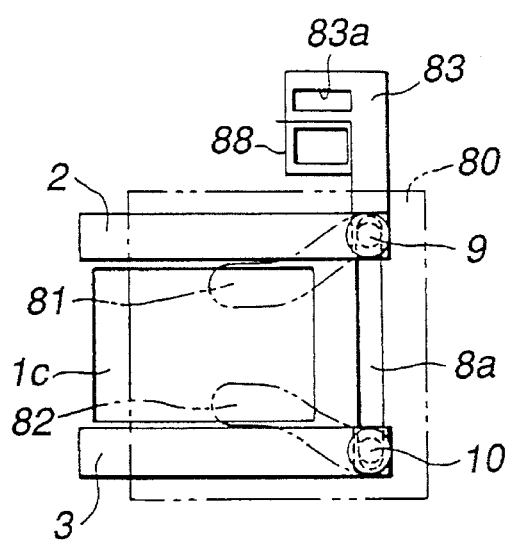
FIG. 28 is a rear view which illustrates an essential portion of a state where the photographing frame size is changed, to the full size in a camera capable of changing over the photographing frame size thereof according to the seventh embodiment.
Figure 29:
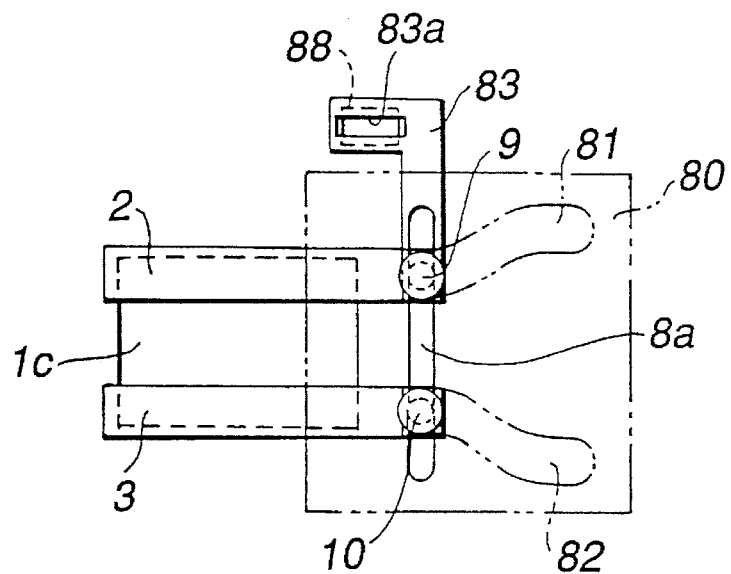
FIG. 29 is a rear view which illustrates an essential portion of a state where the photographing frame size is changed to the panorama size in the camera capable of changing over the photographing frame size thereof according to the seventh embodiment.

The operation of the camera according to the seventh embodiment thus constituted will now be described. FIGS. 26 and 28 illustrate a state where a full-size photograph is taken. FIGS. 27 and 29 illustrate a state where a panorama size photograph is taken.

When the film 15 is loaded into the camera body 1, the film 15 is positioned between the masking members 2, 3 and the pressure plate 7. When the full-size photograph is taken, the frame size changing-over member 80 is slid in a direction N (see FIG. 24). As a result, the magnets 9 and 10 are moved apart to end portions 81a and 82a of the cam groove recesses 81 and 82 in the changing-over member 80. That is, the magnet 9 is moved upwards, while the magnet 10 is moved downwards. The movements of the magnets 9 and 10 cause the mask supporting members 4 and 5 magnetically coupled to the magnets 9 and 10 to slide in the vertical directions. Since the masking members 2 and 3 are integrally secured to the mask supporting members 4 and 5, the movements of the mask supporting members 4 and 5 cause the masking member 2 to be moved upwards and cause the masking member 3 to be moved downwards so that they are moved to the positions outside the aperture 1c. Therefore, the aperture 1c realizes the full-size photographing frame.

When the mask supporting member has been moved upwards, also the panorama visual field frame member 83 is moved upwards, causing its panorama visual field frame portion 83a to be moved outside the finder visual field. As a result, the finder has the full-size visual field, and, accordingly, the full size photographing state is realized.

When a panorama size photograph is taken, the frame size changing-over member 80 is caused to slide in a direction P (see FIG. 24). As a result, the magnets 9 and 10 are moved to approach each other by the cam groove recesses 81 and 82 in the changing-over member 80 to the positions of the other end portions 81b and 82b of the cam groove recesses 81 and 82. That is, the magnet 9 is moved downwards, while the magnet 10 is moved upwards. The movement of the magnets 9 and 10 cause the mask supporting members 4 and 5 magnetically coupled to the magnets 9 and 10 to slide downwards and upwards, respectively. At this time, the elasticity of the contractive coil spring 11A is charged. In the foregoing manner, the movements of the mask supporting members 4 and 5 cause the masking member 2 to be moved downwards and the masking member 3 to be moved upwards to mask the top and the lower end portions of the aperture 1c. As a result, a panorama-size aperture is formed, resulting in a panorama size photographing frame of the film.

When the mask supporting member 4 has been moved downwards, also the panorama visual field frame member 83 is moved downwards, causing its panorama visual field frame portion 83a to be moved to the visual field for the finder as shown in FIG. 27. Thus, the panorama visual field frame portion 83a covers the standard size visual field frame of the usual frame size. Therefore, the finder has the panorama size visual field, enabling a panorama size photograph to be taken.

If the magnetic coupling between the magnets 9, 10 and the mask supporting members 4, 5 is cancelled in the foregoing state due to shock given to the camera for some reason, the notifying means according to the present invention acts. That is, if the magnetic coupling is cancelled, the frame-size changing-over member 80 is maintained at the panorama position but the mask supporting members 4 and 5 receive the suspension elasticity of the coil spring 11A to move the masking member 2 and upwards to move the masking member 3 downwards to the positions outside the aperture 1c. Therefore, the aperture 1c has the full-size photographing frame. When the mask supporting members 4 and 5 are, therefore, moved, the panorama visual field frame member 83 is also moved upwards to the position outside the visual field for the finder. Therefore, the finder has the full size visual field.

If the magnetic coupling realized by the magnets is cancelled for some reason and, accordingly, the frame size is changed, the finder visual field is also changed over simultaneously. Therefore, the position at which the frame size changing-over member 80 is switched and the visual field for the finder do not coincide with each other, resulting in recognition by a user who takes the photograph. Hence, an operation of taking an undesirable photograph for the user can be prevented.

Figure 30:
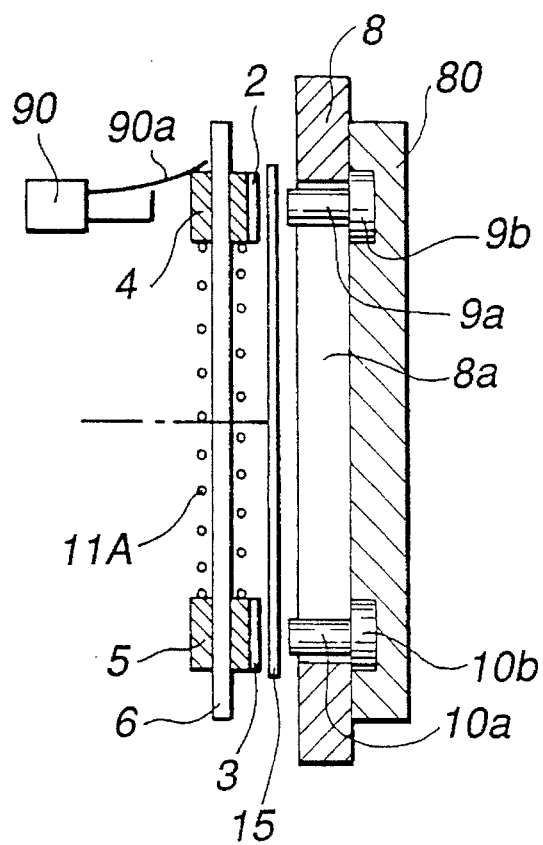
FIG. 30 is an enlarged cross sectional view which illustrates an essential portion of a state where the photographing frame size is changed to the full size in a camera capable of changing over the photographing frame size thereof according to an eighth embodiment of the present invention.
Figure 31:
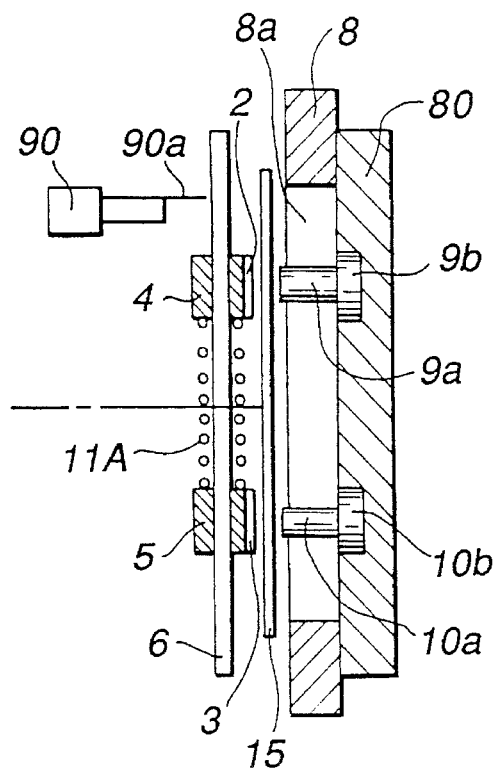
FIG. 31 is an enlarged cross sectional view which illustrates an essential portion of a state where the photographing frame size is changed to the panorama size in the camera capable of changing over the photographing frame size thereof according to the eighth embodiment of the present invention.

FIGS. 30 to 33 illustrate an eighth embodiment of the present invention comprising a notifying means which is different from the foregoing notifying means. The arrangement of the eighth embodiment is substantially similar to the seventh embodiment except for the arrangements that the panorama visual field frame member 83 according to the seventh embodiment is omitted and that a panorama changing-over switch 90 is provided as shown in FIGS. 30 and 31.

The panorama changing-over switch 90 has a movable contact 90a disposed on the movement passage for the mask supporting member 4 to be switched on/off due to the movement of the mask supporting member 4. That is, when the mask supporting member 4 is at the standard size position, the movable contact 90a of the changing-over switch 90 is pushed upwards by the mask supporting member 4, and, therefore, the changing-over switch 90 is switched off. When the mask supporting member 4 has been moved to the panorama size position, the force for raising the movable contact 90a of the changing-over switch 90 effected by the mask supporting member 4 is cancelled as shown in FIG. 31. Therefore, the changing-over switch is switched on.

Figure 32:
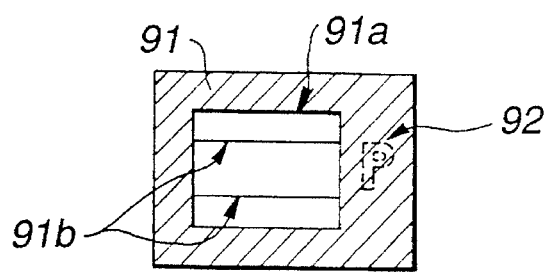
FIGS. 32 and 33 respectively are front elevational views which illustrate a finder visual field of the camera capable of changing over the photographing frame size thereof according to the eighth embodiment of the present invention.
Figure 33:
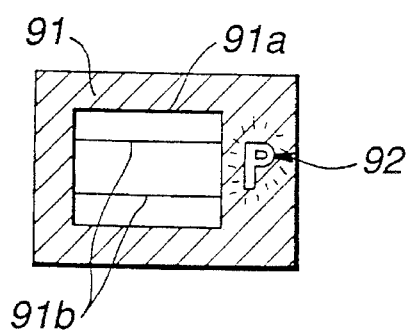

FIGS. 32 and 33 illustrate the finder visual field. FIG. 32 illustrates a state where an ordinary standard size photograph is taken. FIG. 33 illustrates the state where the panorama size photograph is taken. The finder visual field frame 91 has a standard-size visual field frame 91a and a frame line 91b for determining the composition for the panorama size. Furthermore, a P-mark 92 indicating the panorama size mode emits light at a position to the right of the visual field frame 91a when an LED (omitted from illustration) for the finder emits light due to the switching-on operation of the panorama changing-over switch 90.

In the eighth embodiment thus constituted, when the standard size photograph is taken, the frame size changing-over member 80 (see FIG. 24) is moved in the direction N, the mask supporting member 4 is moved upwards and the mask supporting member 5 is moved downwards, causing the masking members 2 and 3 to be moved outside the aperture 1c. As a result, the standard size photographing frame is realized. When the mask supporting member 4 has been moved upwards, the panorama changing-over switch 90 is switched off, and, accordingly, the LED for the finder is turned off, causing the P-mark 92 to be eliminated from the finder visual field. Therefore, the user of the camera is able to confirm that the camera is in the standard size photographing state.

When the panorama size photograph is taken, the frame size changing-over member 80 (see FIG. 24) is moved in the direction P. As a result, the mask supporting member 4 is moved downwards and the mask supporting member 5 is moved upwards, causing the masking members 2 and 3 to be introduced into the aperture 1c. As a result, the panorama size photographing frame is realized. Since the mask supporting member 4 is moved downwards, the panorama changing-over switch 90 is switched on, causing the LED for the finder to emit light. As a result, the P-mark 92 emits light in the visual field for the finder. As a result, the user of the camera is able to know that the camera is in the panorama-size photographing state.

If the magnetic coupling between the magnets 9, 10 and the mask supporting members 4, 5 is cancelled in the panorama-size photographing state due to shock given to the camera for some reason, the notifying means according to the present invention acts. That is, if the magnetic coupling is cancelled, the frame-size changing-over member 80 is maintained at the panorama position but the mask supporting members 4 and 5 receive the suspension elasticity of the coil spring 11A to move upwards the masking member 2 and to move downwards the masking member 3 to the positions outside the aperture 1c. Therefore, the aperture 1c has the full-size photographing frame although the frame-size changing-over member 80 is positioned at the panorama position. When the mask supporting member 4 has been moved, the movable contact 90a is pushed upwards, resulting in the switch 90 being switched off as shown in FIG. 30. Therefore, the light emission of the LED for the finder is stopped, causing the P-mark 92 in the visual field for the finder to be turned off.

If the magnetic coupling realized by the magnets is cancelled for some reason and, accordingly, the frame size is changed, the finder visual field is also changed over simultaneously. Therefore, the position at which the frame size changing-over member 80 is switched and the visual field for the finder do not coincide with each other, resulting in recognition by a user taking the photograph. Hence, an operation of taking an undesirable photograph for the user can be prevented.

Although the eighth embodiment has the arrangement that the P-mark 92 is lit on in the visual field for the finder by making use of the LED for the finder, another structure may, of course, be employed in which a PVC (Piezo Ceramic Vibrator) is included to generate sound when the panorama changing-over switch 90 is switched on.

According to the eighth embodiment and the foregoing seventh embodiment, even if the adsorption of the magnets is cancelled and, accordingly, the frame size has been changed over due to shock or the like in the camera capable of changing-over the photographing frame size wherein the photographing frame size is changed over from outside of the camera by making use of the magnet, the present invention has the arrangement that the foregoing fact is notified to the user. Therefore, the user of the camera is able to recognize it and, accordingly, taking of an undesirable photograph can be prevented.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A camera capable of changing over a photographing frame size thereof, comprising:

photographing frame size changing means disposed in a camera body and capable of moving between a first position at which said photographing frame size changing means partially covers a film exposing opening and a second position displaced from said film exposing opening; and operation means disposed on a rear cover of said camera and accessible from an external side of said camera for moving said changing means between said first position and said second position, said rear cover comprising moving means rendering said rear cover movable between open and closed positions.

2. A camera according to claim 1 further comprising switch means operable between an on and an off state responsive to respective movement of said photographing frame size changing means to said first and second position; and display means responsive to the state of said switch means for providing an illuminated display representing the position of said restriction means.

3. The camera according to claim 1, wherein said moving means comprises means for facilitating removal and insertion of film from and into said camera.

4. The camera according to claim 1, wherein said operation means is disposed between a cartridge chamber and a film take-up chamber of said camera.

5. The camera according to claim 1, wherein said operation means is disposed at a position corresponding to an aperture of said camera.

6. The camera according to claim 5, wherein said operation means is disposed directly behind and in alignment with said aperture.

7. The camera according to claim 5, wherein said means for operating is disposed directly behind and in alignment with said aperture.

8. The camera according to claim 1, wherein said operation means comprises means for translating movement of a manually movable member accessible from an external side of said camera to movement of said changing means between said first position and said second position.

9. The camera according to claim 8, wherein said operation means comprises means for manually moving said changing means.

10. The camera according to claim 8, wherein said means for operating consists of means for manually moving said frame size setting means.

11. The camera according to claim 1, wherein said moving means comprises means for facilitating removal and insertion of film from and into said camera.

12. The camera according to claim 1, wherein said means for operating is disposed between a cartridge chamber and a film take-up chamber of said camera and is accessible from outside of said camera.

13. The camera according to claim 1, wherein said means for operating is disposed at a position corresponding to an aperture of said camera.

14. The camera according to claim 1, wherein said means for operating comprises means for translating movement of a manually movable member accessible from an external side of said camera to movement of said frame size means.

15. A camera capable of changing over a photographing frame size thereof, comprising:

a photographing frame size changing member disposed in a camera body and capable of moving between a first position at which said photographing frame size Changing member partially covers a film exposing opening and a second position displaced from said film exposing opening; and an operation member disposed on a rear cover of said camera for moving said photographing frame size changing member between said first position and said second position via coupling means, said coupling means non-mechanically coupling movement to said photographing frame size changing member from said operation member when said film is interposed between said photographing frame size changing member and said operation member.

16. A camera capable of changing over a photographing frame size thereof according to claim 15, wherein said coupling means includes a magnetic member.

17. The camera according to claim 15, wherein said rear cover comprises moving means rendering said rear cover movable between open and closed positions.

18. The camera according to claim 17, wherein said moving means comprises means for facilitating removal and insertion of film from and into said camera.

19. The camera according to claim 17, wherein said operation member is disposed between a cartridge chamber and a film take-up chamber of said camera.

20. The camera according to claim 17, wherein said operation member is disposed at a position corresponding to an aperture of said camera.

21. The camera according to claim 20, wherein said operation member is disposed directly behind and in alignment with said aperture.

22. The camera according to claim 17, wherein said operation member comprises means for translating movement of a manually movable member accessible from an external side of said camera to movement of said changing member between said first position and said second position.

23. The camera according to claim 22, wherein said operation member comprises means for manually moving said changing member.

24. A camera capable of changing over a photographing frame size thereof, comprising:

a photographing frame size changing member disposed in a camera body and capable of moving between a first position at which said photographing frame size changing member partially covers a film exposing opening and a second position displaced from said film exposing opening, said photographing frame size changing member having, in at least a portion thereof, a first portion made of magnetic material; and a changing-over operation member disposed on a rear cover of said camera for moving said photographing frame size changing member between said first position and said second position, said changing-over operation member having a cooperating portion capable of moving between a position at which said cooperating portion faces said first portion and a position at which the cooperating portion does not face said first portion and is made of magnetic material, wherein at least one of said magnetic material of said first portion and said magnetic material of said cooperating portion is a permanent magnet.

25. A camera capable of changing over a photographing frame size thereof according to claim 24, wherein said photographing frame size restriction member comprises a pair of thin plates and is slidably held in a vertical direction by a single guide shaft.

26. A camera capable of changing over a photographing frame size thereof according to claim 25, wherein said guide shaft is disposed at a position to one side of said exposure opening of said camera body and extends in a direction perpendicular to a direction in which said film is moved.

27. A camera capable of changing over a photographing frame size thereof according to claim 24, wherein said changing-over operation member further has an operation knob mounted on said rear cover so as to be linearly slidable therealong, a cam member having a pair of cam surfaces and capable of sliding responsive to sliding of said operation knob, said first and second portions each comprising a pair of magnetic members and a spring member for pressing the pair of members of said second portion against said pair of cam surfaces.

28. A camera capable of changing over a photographing frame size thereof according to claim 24, wherein said photographing frame size changing member comprises a pair of thin plates, each of which is rotatably mounted between guide shafts having longitudinal axes disposed in parallel to said direction in which said film is moved, and each of which is urged to rotate in a direction to be moved away from a surface of said film.

29. A camera capable of changing over a photographing frame size thereof according to claim 24, wherein said changing-over operation member has an operation knob rotatably mounted on said rear cover.

30. A camera according to claim 24 wherein said second portions are movable along a substantially linear path.

31. A camera according to claim 24 wherein said second portions are movable along a curved path.

32. The camera according to claim 24, wherein said rear cover comprises moving means rendering said rear cover movable between open and closed positions.

33. The camera according to claim 24, wherein said moving means comprises means for facilitating removal and insertion of film from and into said camera.

34. The camera according to claim 24, wherein said operation member is disposed between a cartridge chamber and a film take-up chamber of said camera.

35. The camera according to claim 24, wherein said operation member is disposed at a position corresponding to an aperture of said camera.

36. The camera according to claim 35, wherein said operation member is disposed directly behind and in alignment with said aperture.

37. The camera according to claim 24, wherein said operation member comprises means for translating movement of a manually movable member accessible from an external side of said camera to movement of said changing member between said first position and said second position.

38. The camera according to claim 37, wherein said operation member comprises means for manually moving said changing member.

39. A camera capable of changing over a photographing frame size thereof, comprising:
- a photographing frame size changing member disposed in a camera body and movable between a first position at which said photographing frame size changing member partially covers a film exposing opening and a second position displaced from said film exposing opening, said photographing frame size changing member comprising a pair of thin members having springy characteristics;
- a rotatable member disposed on a rear cover of said camera for moving said pair of thin members between said first position and said second position; and
- a changing-over operation member disposed on said rear cover and accessible from an external side of said camera for rotating said rotatable member, said rear cover comprising moving means rendering said rear cover movable between open and closed positions.

40. The camera of claim 39 wherein said operation member is disposed along an external surface of the cover to facilitate manual operation by an operator.

41. The camera according to claim 39, wherein said moving means comprises means for facilitating removal and insertion of film from and into said camera.

42. The camera according to claim 39, wherein said operation member is disposed between a cartridge chamber and a film take-up chamber of said camera.

43. The camera according to claim 39, wherein said operation member is disposed at a position corresponding to an aperture of said camera.

44. The camera according to claim 43, wherein said operation member is disposed directly behind and in alignment with said aperture.

45. The camera according to claim 39, wherein said operation member comprises means for translating movement of a manually movable member accessible from an external side of said camera to movement of said changing member between said first position and said second position.

46. The camera according to claim 45, wherein said operation member comprises means for manually moving said changing member.

47. A camera capable of changing over a photographing frame size thereof, comprising:
- a photographing frame size restriction member disposed in a camera body and rotatable between a first position at which said photographing frame size restriction member partially covers a film exposing opening and a second position displaced from said film exposing opening, said photographing frame size restriction member having, on at least a portion thereof, a first portion comprising one of a magnetic material and a permanent magnet;
- a spring member for urging said photographing frame size restriction member toward said second position; and
- a changing-over operation member disposed on a rear cover of said camera for moving said restriction member between said first position and said second position, said changing-over operation member having a second portion capable of moving between a position at which said second portion faces said first portion and a position at which the second portion is displaced from said first portion and is made of one of a permanent magnet and a magnetic material.

48. A camera capable of changing over a photographing frame size thereof according to claim 47, wherein shafts for swingably mounting said photographing frame size restriction member are positioned in recesses formed in top and bottom end portions of said exposure opening.

49. The camera according to claim 47, wherein said rear cover comprises moving means rendering said rear cover movable between open and closed positions.

50. The camera according to claim 47, wherein said moving means comprises means for facilitating removal and insertion of film from and into said camera.

51. The camera according to claim 47, wherein said operation member is disposed between a cartridge chamber and a film take-up chamber of said camera.

52. The camera according to claim 47, wherein said operation member is disposed at a position corresponding to an aperture of said camera.

53. The camera according to claim 52, wherein said operation member is disposed directly behind and in alignment with said aperture.

54. The camera according to claim 47, wherein said operation member comprises means for translating movement of a manually movable member accessible from an external side of said camera to movement of said restriction member between said first position and said second position.

55. The camera according to claim 54, wherein said operation member comprises means for manually moving said restriction member.

56. A camera capable of changing over a photographing frame size thereof, comprising:
- a lens barrel movable between a photographing position and a photography preparation position;
- a photographing frame size changing member disposed in a camera body and movable between a first position at which said photographing frame size changing member partially covers a film exposing opening and a second position displaced from said film exposing opening, said photographing frame size changing member having, on at least a portion thereof, a first portion comprised of one of a magnetic material and a permanent magnet;
- a spring member urging said photographing frame size changing member toward said second position;
- a changing-over operation member disposed on a rear cover of said camera for moving said changing member between said first position and said second position, said changing-over operation member having a second portion capable of moving between a position at which said second portion faces said first portion and a position at which the second portion is displaced from said first portion and comprises one of a permanent magnet and a magnetic material; and an elastic member disposed in said lens barrel for urging said photographing frame size changing member to said first position when the lens barrel is at a photography preparation position.

57. The camera according to claim 56, wherein said rear cover comprises moving means rendering said rear cover movable between open and closed positions.

58. The camera according to claim 56, wherein said moving means comprises means for facilitating removal and insertion of film from and into said camera.

59. The camera according to claim 56, wherein said operation member is disposed between a cartridge chamber and a film take-up chamber of said camera.

60. The camera according to claim 56, wherein said operation member is disposed at a position corresponding to an aperture of said camera.

61. The camera according to claim 60, wherein said operation member is disposed directly behind and in alignment with said aperture.

62. The camera according to claim 56, wherein said operation member comprises means for translating movement of a manually movable member accessible from an external side of said camera to movement of said changing member between said first position and said second position.

63. The camera according to claim 62, wherein said operation member comprises means for manually moving said changing member.

64. A camera capable of changing over a photographing frame size thereof, comprising:

a lens barrel movable between a photographing position, a photography preparation position and a collapsed position;

a photographing frame size changing member disposed in a camera body and movable between a first position at which said photographing frame size changing member partially covers a film exposing opening and a second position displaced from said film exposing opening, said photographing frame size changing member having, in at least a portion thereof, a first portion comprised of one of a magnetic material and a permanent magnet;

a spring member for urging said photographing frame size changing member toward said second position;

a changing-over operation member disposed on a rear cover of said camera for moving said changing member between said first position and said second position, said changing-over operation member having a second portion movable between a position at which said second portion faces said first portion and a position at which the second portion is displaced from said first portion and comprises one of a permanent magnet and a magnetic material; and an elastic member disposed in said lens barrel for urging said photographing frame size changing member to said first position when said lens barrel is moved to one of said photography preparation position and said collapsed position.

65. The camera according to claim 64, wherein said rear cover comprises moving means rendering said rear cover movable between open and closed positions.

66. The camera according to claim 64, wherein said moving means comprises means for facilitating removal and insertion of film from and into said camera.

67. The camera according to claim 64, wherein said operation member is disposed between a cartridge chamber and a film take-up chamber of said camera.

68. The camera according to claim 64, wherein said operation member is disposed at a position corresponding to an aperture of said camera.

69. The camera according to claim 68, wherein said operation member is disposed directly behind and in alignment with said aperture.

70. The camera according to claim 64, wherein said operation member comprises means for translating movement of a manually movable member accessible from an external side of said camera to movement of said changing member between said first position and said second position.

71. The camera according to claim 70, wherein said operation member comprises means for manually moving said changing member.

72. A camera capable of changing over a photographing frame size thereof, comprising:

a photographing frame size changing member disposed in a camera body and movable between a first position at which said photographing frame size changing member partially covers a film exposing opening and a second position displaced from said film exposing opening;

a display member to be operated in accordance with a position of said frame size changing member, said display member displaying that said changing member is positioned at one of said first position and said second position; and an operation member disposed on a rear cover of said camera and accessible from an external side of said camera for moving said changing member between said first position and said second position, said rear cover comprising moving means rendering said rear cover movable between open and closed positions.

73. A camera capable of changing over a photographing frame size thereof according to claim 72, wherein said display member comprises a finder visual field frame operated by said restriction member and movable to positions into alignment with and displaced from a finder of said camera responsive to operation of said restriction member.

74. The camera according to claim 72, wherein said moving means comprises means for facilitating removal and insertion of film from and into said camera.

75. The camera according to claim 72, wherein said operation member is disposed between a cartridge chamber and a film take-up chamber of said camera.

76. The camera according to claim 72, wherein said operation member is disposed at a position corresponding to an aperture of said camera.

77. The camera according to claim 76, wherein said operation member is disposed directly behind and in alignment with said aperture.

78. The camera according to claim 77, wherein said operation member comprises means for manually moving said changing member.

79. The camera according to claim 72, wherein said operation member comprises means for translating movement of a manually movable member accessible from an external side of said camera to movement of said changing member between said first position and said second position.

80. A camera capable of changing over a photographing frame size thereof, comprising:

a camera body having a mask defining a first frame size;

masking means for defining a second frame size smaller than said first frame size, said masking means being disposed at a position closer to a photographing optical system than said mask defining said first frame size and is urged to be moved to a position at which said masking means defining said second frame size is displaced from said mask defining said first frame size, said masking means defining said second frame size having first magnetic means;

a photographing optical system movable between a photography preparation position and a photographing position in a direction of an optical axis, said photographing optical system moving said masking means defining said second frame size in position with said mask defining said first frame size against said urging force when said photographing optical system is at said photography preparation position;

rear cover means disposed in a rear portion of said camera for selectively opening/closing a film accommodation chamber; and changing-over means provided for said rear cover means, having second magnetic means, and changing over a state between an attraction state in which said second magnetic means is attracted to said first magnetic means of said masking means for said second frame size against said urging force and a non-attraction state in which the second magnetic means is not attracted to said first magnetic means of said masking means for said second frame size, wherein a small photographing frame is realized when said photographing optical system has been moved to said photographing position in a state where said changing-over means brings said masking means for said second frame size into a position corresponding to said attraction state, and an large frame is realized when said photographing optical system has been moved to said photographing position corresponding to a state where said changing means brings said masking means for said second frame size into said non-attraction state.

81. A camera capable of changing over a photographing frame size thereof according to claim 80, wherein one of said first and second magnetic means is a magnet.

82. A camera capable of changing over a photographing frame size thereof according to claim 80, wherein said small frame size is a panorama size frame.

83. A camera capable of changing over a photographing frame size thereof according to claim 80 further comprising small frame size display means which is operated in synchronization with said masking means defining said small frame size in such a manner that said small frame size display means does not display said small frame size when said masking means defining said small frame size is moved to a position at which said masking means defining said small frame size is displaced from said mask defining said ordinary frame size.

84. A camera capable of changing over a photographing frame size thereof according to claim 83, wherein said small frame size display means sets a visual field in a finder to a size that corresponds to said small frame size.

85. A camera capable of changing over a photographing frame size thereof according to claim 83, wherein said small frame size display means is a light emitting member disposed in a finder.

86. The camera according to claim 80, wherein said rear cover means comprises moving means rendering a rear cover movable between open and closed positions.

87. The camera according to claim 80, wherein said moving means comprises means for facilitating removal and insertion of film from and into said camera.

88. The camera according to claim 80, wherein said changing-over means is disposed between a cartridge chamber and a film take-up chamber of said camera.

89. The camera according to claim 80, wherein said changing-over means is disposed at a position corresponding to an aperture of said camera.

90. The camera according to claim 89, wherein said changing-over means is disposed directly behind and in alignment with said aperture.

91. The camera according to claim 80, wherein said changing-over means comprises means for translating movement of a manually movable member accessible from an external side of said camera to movement of said masking means defining a second frame size.

92. The camera according to claim 91, wherein said changing-over means comprises means for manually moving said masking means defining a second frame size.

93. A camera capable of changing over a photographing frame size thereof, comprising:

a photographing optical system movable between a photography preparation position and a photographing position in a direction of an optical axis at each photographing operation;

masking means defining a first frame size when said photographing optical system is at said photography preparation position and which provides a second frame size when said photographing optical system is at said photographing position;

rear cover means; and changing-over means disposed on said rear cover means being accessible from an external side of said camera and having an operating state for controlling said masking means to retain said first frame size even if said photographing optical system has been moved to said photographing position, said rear cover means comprising a rear cover and moving means rendering said rear cover movable between open and closed positions.

94. The camera according to claim 93, wherein said moving means comprises means for facilitating removal and insertion of film from and into said camera.

95. The camera according to claim 93, wherein said changing-over means is disposed between a cartridge chamber and a film take-up chamber of said camera.

96. The camera according to claim 93, wherein said changing-over means is disposed at a position corresponding to an aperture of said camera.

97. The camera according to claim 96, wherein said changing-over means is disposed directly behind and in alignment with said aperture.

98. The camera according to claim 93, wherein said changing-over means comprises means for translating movement of a manually movable member accessible from an external side of said camera to movement of said masking means.

99. The camera according to claim 98, wherein said changing-over means comprises means for manually moving said masking means.

100. A camera capable of changing over a photographing frame thereof between a first size frame and a second size frame having a size which is smaller than said first size frame, said camera comprising:

frame size setting means for changing over said photographing frame between said first size frame and said second size frame; and rear cover means having means for operating said frame size setting means to one of said first size frame and said second size frame, said rear cover means comprising a rear cover and moving means rendering said rear cover movable between open and closed positions, said means for operating including means mounted on said rear cover for selecting one of the frame sizes.

* * * * *